United States Patent
Brady et al.

(10) Patent No.: US 9,205,717 B2
(45) Date of Patent: Dec. 8, 2015

(54) VEHICLE HAVING SUSPENSION WITH CONTINUOUS DAMPING CONTROL

(71) Applicant: Polaris Industries Inc., Medina, MN (US)

(72) Inventors: Louis J. Brady, Wyoming, MN (US); Alex R. Scheuerell, White Bear Lake, MN (US); Steven R. Franker, North Branch, MN (US); Aaron J. Nysse, Stacy, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/507,355

(22) Filed: Oct. 6, 2014

(65) Prior Publication Data
US 2015/0057885 A1 Feb. 26, 2015

Related U.S. Application Data

(63) Continuation-in-part of application No. 14/074,340, filed on Nov. 7, 2013.

(60) Provisional application No. 61/723,623, filed on Nov. 7, 2012.

(51) Int. Cl.
*B60G 17/015* (2006.01)
*B60G 17/016* (2006.01)
(Continued)

(52) U.S. Cl.
CPC .......... *B60G 17/016* (2013.01); *B60G 17/0162* (2013.01); *B60G 17/0165* (2013.01);
(Continued)

(58) Field of Classification Search
USPC .......... 280/5.504, 5.512, 5.514, 5.519, 6.154; 701/37, 38, 70
See application file for complete search history.

(56) References Cited

U.S. PATENT DOCUMENTS 4,600,215 A 7/1986 Kuroki et al.
4,722,548 A 2/1988 Hamilton et al.
(Continued)

FOREIGN PATENT DOCUMENTS

CN 2255379 Y 6/1997
CN 2544987 Y 4/2003
(Continued)

OTHER PUBLICATIONS

International Search Report and Written Opinion issued by the European Patent Office, dated Feb. 18, 2014, for International Application No. PCT/US2013/068937; 11 pAGES.
(Continued)

*Primary Examiner* — Toan To
(74) *Attorney, Agent, or Firm* — Faegre Baker Daniels LLP

(57) ABSTRACT

A damping control system for a vehicle having a suspension located between a plurality of ground engaging members and a vehicle frame includes at least one adjustable shock absorber having an adjustable damping characteristic. The system also includes a controller coupled to each adjustable shock absorber to adjust the damping characteristic of each adjustable shock absorber, and a user interface coupled to the controller and accessible to a driver of the vehicle. The user interface includes at least one user input to permit manual adjustment of the damping characteristic of the at least one adjustable shock absorber during operation of the vehicle. Vehicle sensors are also be coupled to the controller to adjust the damping characteristic of the at least one adjustable shock absorber based vehicle conditions determined by sensor output signals.

23 Claims, 12 Drawing Sheets

(51) Int. Cl.
*B60G 17/0165* (2006.01)
*B60G 17/08* (2006.01)

(52) U.S. Cl.
CPC ............ *B60G17/08* (2013.01); *B60G 2300/07* (2013.01); *B60G 2300/32* (2013.01); *B60G 2300/322* (2013.01); *B60G 2400/102* (2013.01); *B60G 2400/204* (2013.01); *B60G 2400/252* (2013.01); *B60G 2400/33* (2013.01); *B60G 2400/39* (2013.01); *B60G 2400/40* (2013.01); *B60G 2400/61* (2013.01); *B60G 2600/02* (2013.01); *B60G 2600/04* (2013.01); *B60G 2600/20* (2013.01); *B60G 2600/70* (2013.01); *B60G 2800/014* (2013.01); *B60G 2800/162* (2013.01); *B60G 2800/916* (2013.01); *B60G 2800/94* (2013.01)

(56) References Cited

U.S. PATENT DOCUMENTS

| | | | |
|---|---|---|---|
| 4,749,210 A | | 6/1988 | Sugasawa |
| 4,779,895 A | | 10/1988 | Rubel |
| 4,826,205 A | * | 5/1989 | Kouda et al. ............... 280/5.501 |
| 4,827,416 A | * | 5/1989 | Kawagoe et al. ............... 701/38 |
| 4,867,474 A | | 9/1989 | Smith |
| 4,927,170 A | | 5/1990 | Wada |
| 4,949,989 A | | 8/1990 | Kakizaki et al. |
| 5,015,009 A | | 5/1991 | Ohyama et al. |
| 5,024,460 A | | 6/1991 | Hanson et al. |
| 5,062,657 A | | 11/1991 | Majeed |
| 5,071,157 A | | 12/1991 | Majeed |
| 5,080,392 A | | 1/1992 | Bazergui |
| 5,163,538 A | | 11/1992 | Derr et al. |
| 5,189,615 A | | 2/1993 | Rubel et al. |
| 5,342,023 A | | 8/1994 | Kuriki et al. |
| 5,350,187 A | | 9/1994 | Shinozaki |
| 5,361,209 A | | 11/1994 | Tsutsumi |
| 5,361,213 A | * | 11/1994 | Fujieda et al. ............... 701/111 |
| 5,366,236 A | | 11/1994 | Kuriki et al. |
| 5,377,107 A | | 12/1994 | Shimizu et al. |
| 5,390,121 A | | 2/1995 | Wolfe |
| 5,475,596 A | | 12/1995 | Henry et al. |
| 5,483,448 A | | 1/1996 | Liubakka et al. |
| 5,550,739 A | | 8/1996 | Hoffmann et al. |
| 5,586,032 A | | 12/1996 | Kallenbach et al. |
| 5,632,503 A | | 5/1997 | Raad et al. |
| 5,678,847 A | | 10/1997 | Izawa et al. |
| 6,000,702 A | | 12/1999 | Streiter |
| 6,032,752 A | | 3/2000 | Karpik et al. |
| 6,070,681 A | * | 6/2000 | Catanzarite et al. ........ 180/89.15 |
| 6,078,252 A | | 6/2000 | Kulczycki et al. |
| 6,112,866 A | | 9/2000 | Boichot et al. |
| 6,249,728 B1 | | 6/2001 | Streiter |
| 6,352,142 B1 | | 3/2002 | Kim |
| 6,370,458 B1 | * | 4/2002 | Shal et al. ............... 701/37 |
| 6,507,778 B2 | | 1/2003 | Koh |
| 6,604,034 B1 | | 8/2003 | Speck et al. |
| 6,685,174 B2 | | 2/2004 | Behmenburg et al. |
| 6,752,401 B2 | | 6/2004 | Burdock |
| 6,834,736 B2 | | 12/2004 | Kramer et al. |
| 6,851,679 B2 | | 2/2005 | Downey et al. |
| 6,895,318 B1 | | 5/2005 | Barton et al. |
| 6,945,541 B2 | | 9/2005 | Brown |
| 7,011,174 B1 | | 3/2006 | James |
| 7,032,895 B2 | | 4/2006 | Folchert |
| 7,035,836 B2 | | 4/2006 | Caponetto et al. |
| 7,076,351 B2 | | 7/2006 | Hamilton et al. |
| 7,097,166 B2 | | 8/2006 | Folchert |
| 7,136,729 B2 | | 11/2006 | Salman et al. |
| 7,140,619 B2 | | 11/2006 | Hrovat et al. |
| 7,168,709 B2 | | 1/2007 | Niwa et al. |
| 7,233,846 B2 | | 6/2007 | Kawauchi et al. |
| 7,234,707 B2 | | 6/2007 | Green et al. |
| 7,270,335 B2 | | 9/2007 | Hio et al. |
| 7,286,919 B2 | | 10/2007 | Nordgren et al. |
| 7,359,787 B2 | | 4/2008 | Ono et al. |
| 7,386,378 B2 | | 6/2008 | Lauwerys et al. |
| 7,401,794 B2 | | 7/2008 | Laurent et al. |
| 7,421,954 B2 | | 9/2008 | Bose |
| 7,427,072 B2 | | 9/2008 | Brown |
| 7,441,789 B2 | | 10/2008 | Geiger et al. |
| 7,483,775 B2 | | 1/2009 | Karaba et al. |
| 7,510,060 B2 | | 3/2009 | Izawa et al. |
| 7,571,039 B2 | | 8/2009 | Chen et al. |
| 7,600,762 B2 | | 10/2009 | Yasui et al. |
| 7,611,154 B2 | | 11/2009 | Delaney |
| 7,630,807 B2 | | 12/2009 | Yoshimura et al. |
| 7,641,208 B1 | | 1/2010 | Barron et al. |
| 7,644,934 B2 | | 1/2010 | Mizuta |
| 7,684,911 B2 | | 3/2010 | Seifert et al. |
| 7,740,256 B2 | | 6/2010 | Davis |
| 7,751,959 B2 | | 7/2010 | Boon et al. |
| 7,778,741 B2 | | 8/2010 | Rao et al. |
| 7,810,818 B2 | | 10/2010 | Bushko |
| 7,823,891 B2 | | 11/2010 | Bushko et al. |
| 7,862,061 B2 | | 1/2011 | Jung |
| 7,885,750 B2 | | 2/2011 | Lu |
| 7,899,594 B2 | | 3/2011 | Messih et al. |
| 7,912,610 B2 | | 3/2011 | Saito et al. |
| 7,926,822 B2 | | 4/2011 | Ohletz et al. |
| 7,942,427 B2 | | 5/2011 | Lloyd |
| 7,950,486 B2 | | 5/2011 | Van Bronkhorst et al. |
| 7,959,163 B2 | | 6/2011 | Beno et al. |
| 7,962,261 B2 | | 6/2011 | Bushko et al. |
| 7,963,529 B2 | | 6/2011 | Oteman et al. |
| 7,970,512 B2 | | 6/2011 | Lu et al. |
| 7,984,915 B2 | | 7/2011 | Post, II et al. |
| 8,005,596 B2 | | 8/2011 | Lu et al. |
| 8,027,775 B2 | | 9/2011 | Takenaka et al. |
| 8,032,281 B2 | | 10/2011 | Bujak et al. |
| 8,050,818 B2 | | 11/2011 | Mizuta |
| 8,050,857 B2 | | 11/2011 | Lu et al. |
| 8,056,392 B2 | | 11/2011 | Ryan et al. |
| 8,065,054 B2 | | 11/2011 | Tarasinski et al. |
| 8,075,002 B1 | | 12/2011 | Pionke et al. |
| 8,086,371 B2 | | 12/2011 | Furuichi et al. |
| 8,087,676 B2 | | 1/2012 | McIntyre |
| 8,095,268 B2 | | 1/2012 | Parison et al. |
| 8,108,104 B2 | | 1/2012 | Hrovat et al. |
| 8,113,521 B2 | | 2/2012 | Lin et al. |
| 8,116,938 B2 | | 2/2012 | Itagaki et al. |
| 8,121,757 B2 | | 2/2012 | Song et al. |
| 8,170,749 B2 | | 5/2012 | Mizuta |
| 8,190,327 B2 | | 5/2012 | Poilbout |
| 8,209,087 B2 | | 6/2012 | Hagglund et al. |
| 8,214,106 B2 | | 7/2012 | Ghoneim et al. |
| 8,219,262 B2 | | 7/2012 | Stiller |
| 8,229,642 B2 | | 7/2012 | Post, II et al. |
| 8,260,496 B2 | | 9/2012 | Gagliano |
| 8,271,175 B2 | | 9/2012 | Takonaka et al. |
| 8,296,010 B2 | | 10/2012 | Hirao et al. |
| 8,308,170 B2 | | 11/2012 | Van Der Knaap et al. |
| 8,315,764 B2 | | 11/2012 | Chen et al. |
| 8,321,088 B2 | | 11/2012 | Brown et al. |
| 8,322,497 B2 | | 12/2012 | Marjoram et al. |
| 8,352,143 B2 | | 1/2013 | Lu et al. |
| 8,355,840 B2 | | 1/2013 | Ammon et al. |
| 8,374,748 B2 | | 2/2013 | Jolly |
| 8,376,373 B2 | | 2/2013 | Conradie |
| 8,396,627 B2 | | 3/2013 | Jung et al. |
| 8,417,417 B2 | | 4/2013 | Chen et al. |
| 8,424,832 B2 | | 4/2013 | Robbins et al. |
| 8,434,774 B2 | | 5/2013 | LeClerc et al. |
| 8,442,720 B2 | | 5/2013 | Lu et al. |
| 8,444,161 B2 | | 5/2013 | LeClerc et al. |
| 8,447,489 B2 | | 5/2013 | Murata et al. |
| 8,457,841 B2 | | 6/2013 | Knoll et al. |
| 8,473,157 B2 | | 6/2013 | Savaresi et al. |
| 8,517,395 B2 | | 8/2013 | Knox et al. |
| 8,548,678 B2 | | 10/2013 | Ummethala et al. |
| 8,550,221 B2 | | 10/2013 | Paulides et al. |
| 8,573,605 B2 | | 11/2013 | Di Maria |
| 8,626,388 B2 | | 1/2014 | Oikawa |

(56) References Cited

U.S. PATENT DOCUMENTS

| | | |
|---|---|---|
| 8,626,389 B2 | 1/2014 | Sidlosky |
| 8,641,052 B2 | 2/2014 | Kondo et al. |
| 8,645,024 B2 | 2/2014 | Daniels |
| 8,666,596 B2 | 3/2014 | Arenz |
| 8,672,106 B2 | 3/2014 | Laird et al. |
| 8,672,337 B2 | 3/2014 | van der Knaap et al. |
| 8,700,260 B2 | 4/2014 | Jolly et al. |
| 8,712,599 B1 | 4/2014 | Westpfahl |
| 8,712,639 B2 | 4/2014 | Lu et al. |
| 8,718,872 B2 | 5/2014 | Hirao et al. |
| 8,725,351 B1 | 5/2014 | Selden et al. |
| 8,731,774 B2 | 5/2014 | Yang |
| 9,027,937 B2 | 5/2015 | Ryan et al. |
| 2001/0005803 A1 | 6/2001 | Cochofel et al. |
| 2001/0021887 A1 | 9/2001 | Obradovich et al. |
| 2002/0082752 A1 | 6/2002 | Obradovich |
| 2003/0125857 A1 | 7/2003 | Madau et al. |
| 2003/0200016 A1 | 10/2003 | Spillane et al. |
| 2003/0205867 A1 | 11/2003 | Coelingh et al. |
| 2004/0010383 A1* | 1/2004 | Lu et al. ............ 702/41 |
| 2004/0041358 A1 | 3/2004 | Hrovat et al. |
| 2004/0090020 A1 | 5/2004 | Braswell |
| 2004/0094912 A1 | 5/2004 | Niwa et al. |
| 2004/0107591 A1 | 6/2004 | Cuddy |
| 2005/0098964 A1 | 5/2005 | Brown |
| 2005/0131604 A1* | 6/2005 | Lu .................... 701/38 |
| 2005/0267663 A1 | 12/2005 | Naono et al. |
| 2005/0279244 A1 | 12/2005 | Bose |
| 2005/0280219 A1 | 12/2005 | Brown |
| 2006/0017240 A1 | 1/2006 | Laurent et al. |
| 2006/0278197 A1* | 12/2006 | Takamatsu et al. .......... 123/396 |
| 2006/0284387 A1 | 12/2006 | Klees |
| 2007/0050095 A1 | 3/2007 | Nelson et al. |
| 2007/0073461 A1 | 3/2007 | Fielder |
| 2007/0120332 A1 | 5/2007 | Bushko et al. |
| 2007/0158920 A1 | 7/2007 | Delaney |
| 2007/0255466 A1 | 11/2007 | Chiao |
| 2008/0059034 A1 | 3/2008 | Lu |
| 2008/0172155 A1* | 7/2008 | Takamatsu et al. ............. 701/40 |
| 2008/0183353 A1 | 7/2008 | Post et al. |
| 2008/0243336 A1 | 10/2008 | Fitzgibbons |
| 2008/0275606 A1 | 11/2008 | Tarasinski et al. |
| 2009/0037051 A1 | 2/2009 | Shimizu et al. |
| 2009/0093928 A1* | 4/2009 | Getman et al. .................. 701/37 |
| 2009/0108546 A1 | 4/2009 | Ohletz et al. |
| 2009/0240427 A1 | 9/2009 | Siereveld et al. |
| 2009/0261542 A1 | 10/2009 | McIntyre |
| 2010/0017059 A1 | 1/2010 | Lu et al. |
| 2010/0057297 A1 | 3/2010 | Itagaki et al. |
| 2010/0121529 A1 | 5/2010 | Savaresi et al. |
| 2010/0152969 A1 | 6/2010 | Li et al. |
| 2010/0211261 A1 | 8/2010 | Sasaki et al. |
| 2010/0230876 A1* | 9/2010 | Inoue et al. .............. 267/140.14 |
| 2010/0238129 A1 | 9/2010 | Nakanishi et al. |
| 2010/0252972 A1 | 10/2010 | Cox et al. |
| 2010/0253018 A1 | 10/2010 | Peterson |
| 2010/0259018 A1 | 10/2010 | Honig et al. |
| 2010/0301571 A1 | 12/2010 | van der Knaap et al. |
| 2011/0035089 A1 | 2/2011 | Hirao et al. |
| 2011/0035105 A1 | 2/2011 | Jolly |
| 2011/0074123 A1 | 3/2011 | Fought et al. |
| 2011/0153158 A1 | 6/2011 | Acocella |
| 2012/0029770 A1 | 2/2012 | Hirao et al. |
| 2012/0053790 A1 | 3/2012 | Oikawa |
| 2012/0053791 A1 | 3/2012 | Harada |
| 2012/0078470 A1 | 3/2012 | Hirao et al. |
| 2012/0119454 A1 | 5/2012 | Di Maria |
| 2012/0139328 A1 | 6/2012 | Brown et al. |
| 2012/0168268 A1 | 7/2012 | Bruno et al. |
| 2012/0247888 A1 | 10/2012 | Chikuma et al. |
| 2012/0265402 A1 | 10/2012 | Post, II et al. |
| 2012/0277953 A1 | 11/2012 | Savaresi et al. |
| 2013/0009350 A1 | 1/2013 | Wolf-Monheim |
| 2013/0018559 A1 | 1/2013 | Epple et al. |
| 2013/0030650 A1 | 1/2013 | Norris et al. |
| 2013/0041545 A1 | 2/2013 | Bar et al. |
| 2013/0060423 A1 | 3/2013 | Jolly |
| 2013/0060444 A1 | 3/2013 | Matsunaga et al. |
| 2013/0074487 A1 | 3/2013 | Herold et al. |
| 2013/0079988 A1 | 3/2013 | Hirao et al. |
| 2013/0103259 A1 | 4/2013 | Eng et al. |
| 2013/0158799 A1 | 6/2013 | Kamimura |
| 2013/0161921 A1 | 6/2013 | Cheng et al. |
| 2013/0190980 A1 | 7/2013 | Ramirez Ruiz |
| 2013/0197732 A1 | 8/2013 | Pearlman et al. |
| 2013/0197756 A1 | 8/2013 | Ramirez Ruiz |
| 2013/0218414 A1 | 8/2013 | Meitinger et al. |
| 2013/0226405 A1 | 8/2013 | Koumura et al. |
| 2013/0261893 A1 | 10/2013 | Yang |
| 2013/0304319 A1 | 11/2013 | Daniels |
| 2013/0328277 A1 | 12/2013 | Ryan et al. |
| 2013/0334394 A1 | 12/2013 | Parison, Jr. et al. |
| 2013/0338869 A1 | 12/2013 | Tsumano |
| 2013/0341143 A1 | 12/2013 | Brown |
| 2013/0345933 A1 | 12/2013 | Norton et al. |
| 2014/0001717 A1 | 1/2014 | Giovanardi et al. |
| 2014/0005888 A1 | 1/2014 | Bose et al. |
| 2014/0012467 A1 | 1/2014 | Knox et al. |
| 2014/0046539 A1 | 2/2014 | Wijffels et al. |
| 2014/0058606 A1 | 2/2014 | Hilton |
| 2014/0095022 A1 | 4/2014 | Cashman et al. |
| 2014/0125018 A1 | 5/2014 | Brady et al. |
| 2014/0129083 A1 | 5/2014 | O'Connor et al. |
| 2014/0131971 A1 | 5/2014 | Hou |
| 2014/0136048 A1 | 5/2014 | Ummethala et al. |
| 2014/0156143 A1 | 6/2014 | Evangelou et al. |
| 2014/0167372 A1 | 6/2014 | Kim et al. |
| 2014/0358373 A1* | 12/2014 | Kikuchi et al. ................. 701/38 |
| 2015/0039199 A1* | 2/2015 | Kikuchi ..................... 701/70 |

FOREIGN PATENT DOCUMENTS

| | | |
|---|---|---|
| CN | 1660615 A | 8/2005 |
| CN | 1746803 A | 3/2006 |
| CN | 1749048 A | 3/2006 |
| CN | 1810530 A | 8/2006 |
| CN | 101549626 A | 10/2009 |
| CN | 201723635 U | 1/2011 |
| CN | 201914049 U | 8/2011 |
| CN | 202040257 U | 11/2011 |
| CN | 102069813 B | 6/2012 |
| CN | 102616104 A | 8/2012 |
| CN | 102627063 A | 8/2012 |
| CN | 102678808 A | 9/2012 |
| CN | 102729760 A | 10/2012 |
| CN | 202468817 U | 10/2012 |
| CN | 102168732 B | 11/2012 |
| CN | 102840265 A | 12/2012 |
| DE | 19508302 A1 | 9/1996 |
| DE | 19922745 A1 | 12/2000 |
| DE | 102010020544 A1 | 1/2011 |
| EP | 0 403 803 B1 | 7/1992 |
| EP | 0 398 804 B1 | 2/1993 |
| EP | 0 405 123 B1 | 10/1993 |
| EP | 0 473 766 B1 | 2/1994 |
| EP | 0 546 295 B1 | 4/1996 |
| EP | 544 108 B1 | 7/1996 |
| EP | 0 691 226 B1 | 12/1998 |
| EP | 1 172 239 A2 | 1/2001 |
| EP | 1 219 475 A1 | 7/2002 |
| EP | 1 164 897 B1 | 2/2005 |
| EP | 2 123 933 A2 | 11/2009 |
| EP | 2 517 904 A9 | 3/2013 |
| EP | 1 449 688 B1 | 6/2014 |
| FR | 2935642 A3 | 3/2010 |
| JP | 2155815 | 6/1990 |
| JP | 4368211 | 12/1992 |
| JP | 5178055 | 7/1993 |
| JP | 6156036 A | 6/1994 |
| JP | 7117433 A | 5/1995 |
| JP | 02898949 B2 | 6/1999 |
| JP | 2001018623 A | 1/2001 |
| JP | 03137209 B2 | 2/2001 |
| JP | 2001 121939 A | 5/2001 |

(56) References Cited

FOREIGN PATENT DOCUMENTS

| | | | |
|---|---|---|---|
| JP | 2002219921 | A | 8/2002 |
| JP | 2009035220 | A | 2/2009 |
| JP | 2009160964 | A | 7/2009 |
| JP | 2011126405 | A | 6/2011 |
| JP | 05149443 | B2 | 2/2013 |
| WO | WO92/10693 | A1 | 6/1992 |

OTHER PUBLICATIONS

International Preliminary Report on Patentability issued by the International Bureau of WIPO, dated May 12, 2015, for International Application No. PCT/US2013/068937; 7 pages.

* cited by examiner

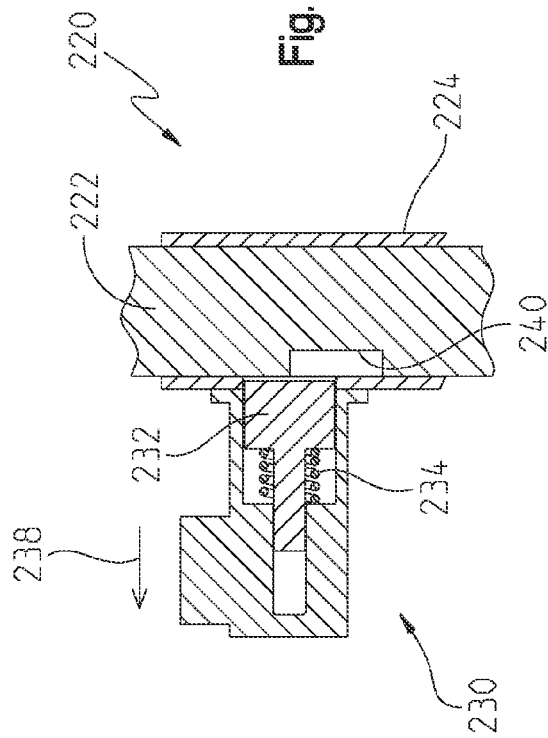
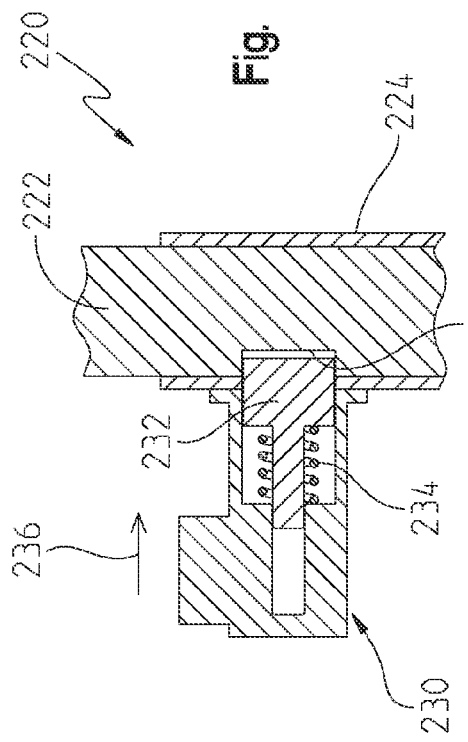
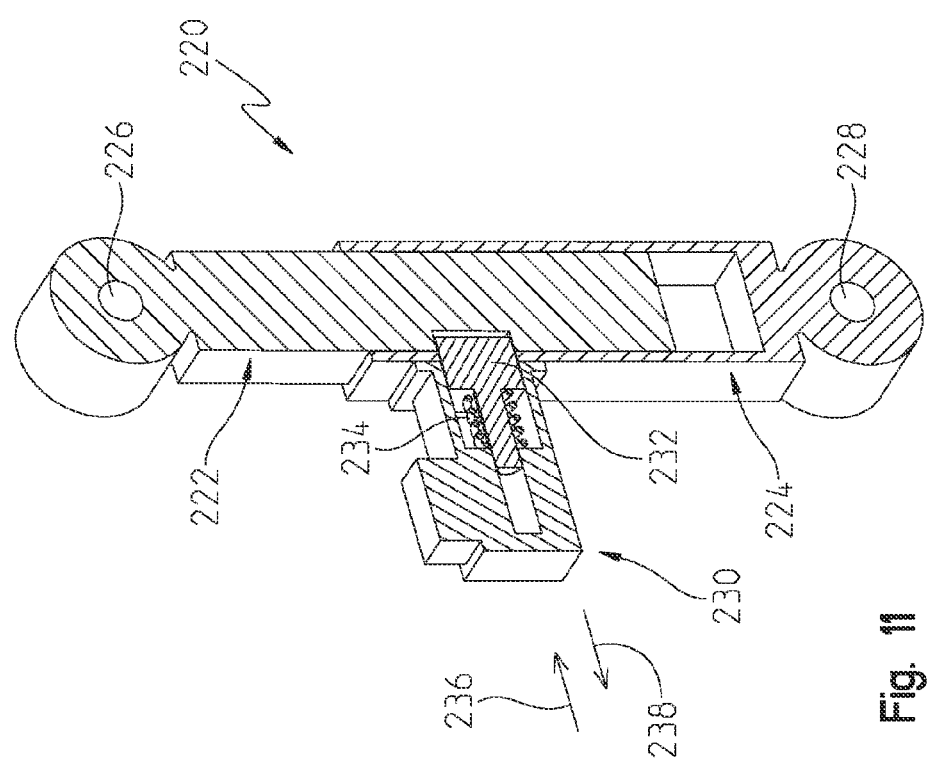

VEHICLE HAVING SUSPENSION WITH CONTINUOUS DAMPING CONTROL

CROSS REFERENCE TO RELATED APPLICATIONS

This application is a continuation-in-part of U.S. application Ser. No. 14/074,340, filed on Nov. 7, 2013, which claims the benefit of U.S. Application Ser. No. 61/723,623, filed on Nov. 7, 2012, the disclosures of which is expressly incorporated herein by reference.

BACKGROUND AND SUMMARY OF THE DISCLOSURE

The present disclosure relates to improved suspension for a vehicle having continuous "on-the-go" damping control for shock absorbers.

Currently some off-road vehicles include adjustable shock absorbers. These adjustments include spring preload, high and low speed compression damping and/or rebound damping. In order to make these adjustments, the vehicle is stopped and the operator makes an adjustment at each shock absorber location on the vehicle. A tool is often required for the adjustment. Some on-road automobiles also include adjustable electric shocks along with sensors for active ride control systems. However, these systems are normally controlled by a computer and are focused on vehicle stability instead of ride comfort. The system of the present disclosure allows an operator to make real time "on-the-go" adjustments to the shocks to obtain the most comfortable ride for given terrain and payload scenarios.

Vehicles often have springs (coil, leaf, or air) at each wheel, track, or ski to support a majority of the load. The vehicle of the present disclosure also has electronic shocks controlling the dynamic movement of each wheel, ski, or track. The electronic shocks have a valve that controls the damping force of each shock. This valve may control compression damping only, rebound damping only, or a combination of compression and rebound damping. The valve is connected to a controller having a user interface that is within the driver's reach for adjustment while operating the vehicle. In one embodiment, the controller increases or decreases the damping of the shock absorbers based on user inputs received from an operator. In another embodiment, the controller has several preset damping modes for selection by the operator. The controller is also coupled to sensors on the suspension and chassis to provide an actively controlled damping system.

In an illustrated embodiment of the present disclosure, a damping control method is provided for a vehicle having a suspension located between a plurality of wheels and a vehicle frame, a controller, a plurality of vehicle condition sensors, and a user interface, the suspension including a plurality of adjustable shock absorbers including a front right shock absorber, a front left shock absorber, a rear right shock absorber, and a rear left shock absorber. The damping control method includes receiving with the controller a user input from the user interface to provide a user selected mode of damping operation for the plurality of adjustable shock absorbers during operation of the vehicle; receiving with the controller a plurality of inputs from the plurality of vehicle condition sensors including a brake sensor, a throttle sensor, and a vehicle speed sensor; determining with the controller whether vehicle brakes are actuated based on an input from the brake sensor; determining with the controller a throttle position based on an input from the throttle sensor; and determining with the controller a speed of the vehicle based on an input from the vehicle speed sensor. The illustrative damping control method also includes operating the damping control in a brake condition if the brakes are actuated, wherein in the brake condition the controller adjusts damping characteristics of the plurality of adjustable shock absorbers based on condition modifiers including the user selected mode and the vehicle speed; operating the damping control in a ride condition if the brakes are not actuated and a throttle position is less than a threshold Y, wherein in the ride condition the controller adjusts damping characteristics of the plurality of adjustable shock absorbers based on condition modifiers including the user selected mode and the vehicle speed; operating the damping control in the ride condition if the brakes are not actuated, the throttle position in greater than the threshold Y, and the vehicle speed is greater than a threshold value Z; and operating the damping control in a squat condition if the brakes are not actuated, the throttle position in greater than the threshold Y, and the vehicle speed is less than the threshold value Z, wherein in the squat condition the controller adjusts damping characteristics of the plurality of adjustable shock absorbers based on condition modifiers including the user selected mode, the vehicle speed, and a throttle percentage.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings.

FIG. 11 is a sectional view of a stabilizer bar of the present disclosure which is selectively decoupled under certain vehicle conditions;

FIG. 12 illustrates the stabilizer bar of FIG. 11 with an actuator in a locked position to prevent movement of a piston of the stabilizer bar;

FIG. 13 is a sectional view similar to FIG. 12 illustrating an actuator in an unlocked position disengaged from the piston of the stabilizer bar to permit movement of the piston relative to a cylinder.

Figure 1:
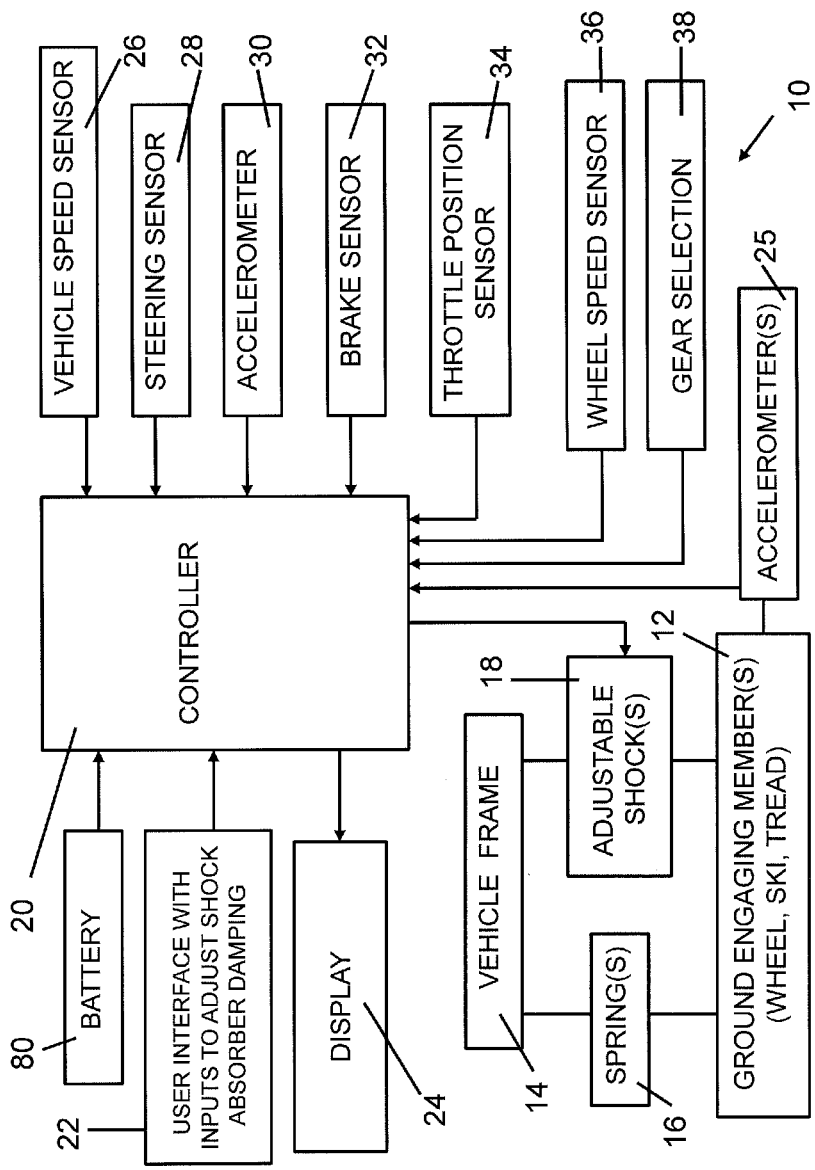
FIG. 1 is a block diagram illustrating components of a vehicle of the present disclosure having a suspension with a plurality of continuous damping control shock absorbers and a plurality of sensors integrated with the continuous damping controller.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Referring now to FIG. 1, the present disclosure relates to a vehicle 10 having a suspension located between a plurality of ground engaging members 12 and a vehicle frame 14. The ground engaging members 12 include wheels, skis, guide tracks, treads or the like. The suspension typically includes springs 16 and shock absorbers 18 coupled between the ground engaging members 12 and the frame 14. The springs 16 may include, for example, coil springs, leaf springs, air springs or other gas springs. The air or gas springs 16 may be adjustable. See, for example, U.S. Pat. No. 7,950,486 incorporated herein by reference. The springs 16 are often coupled between the vehicle frame 14 and the ground engaging members 12 through an A-arm linkage 70 (See FIG. 5) or other type linkage. Adjustable shock absorbers 18 are also coupled between the ground engaging members 12 and the vehicle frame 14. An illustrating embodiment, a spring 16 and shock 18 are located adjacent each of the ground engaging members 12. In an ATV, for example, four springs 16 and adjustable shocks 18 are provided adjacent each wheel 12. Some manufacturers offer adjustable springs 16 in the form of either air springs or hydraulic preload rings. These adjustable springs 16 allow the operator to adjust the ride height on the go. However, a majority of ride comfort comes from the damping provided by shock absorbers 18.

In an illustrated embodiment, the adjustable shocks 18 are electrically controlled shocks for adjusting damping characteristics of the shocks 18. A controller 20 provides signals to adjust damping of the shocks 18 in a continuous or dynamic manner. The adjustable shocks 18 may be adjusted to provide differing compression damping, rebound damping or both.

In an illustrated embodiment of the present disclosure, a user interface 22 is provided in a location easily accessible to the driver operating the vehicle. Preferably, the user interface 22 is either a separate user interface mounted adjacent the driver's seat on the dashboard or integrated onto a display within the vehicle. User interface 22 includes user inputs to allow the driver or a passenger to manually adjust shock absorber 18 damping during operation of the vehicle based on road conditions that are encountered. In another illustrated embodiment, the user inputs are on a steering wheel, handle bar, or other steering control of the vehicle to facilitate actuation of the damping adjustment. A display 24 is also provided on or next to the user interface 22 or integrated into a dashboard display of the vehicle to display information related to the shock absorber damping settings.

In an illustrated embodiment, the adjustable shock absorbers 18 are model number CDC (continuous damping control) electronically controlled shock absorbers available from ZF Sachs Automotive. See Causemann, Peter; *Automotive Shock Absorbers: Features, Designs, Applications*, ISBN 3-478-93230-0, Verl. Moderne Industrie, Second Edition, 2001, pages 53-63, incorporated by reference herein for a description of the basic operation of the shock absorbers 18 in the illustrated embodiment. It is understood that this description is not limiting and there are other suitable types of shock absorbers available from other manufacturers.

The controller 20 receives user inputs from the user interface 22 and adjusts the damping characteristics of the adjustable shocks 18 accordingly. As discussed below, the user can independently adjust front and rear shock absorbers 18 to adjust the ride characteristics of the vehicle. In certain other embodiments, each of the shocks 18 is independently adjustable so that the damping characteristics of the shocks 18 are changed from one side of the vehicle to another. Side-to-Side adjustment is desirable during sharp turns or other maneuvers in which different damping characteristics for shock absorbers 18 on opposite sides of the vehicle improves the ride. The damping response of the shock absorbers 18 can be changed in a matter of microseconds to provide nearly instantaneous changes in damping for potholes, dips in the road, or other driving conditions.

A plurality of sensors are also coupled to the controller 20. For example, the global change accelerometer 25 is coupled adjacent each ground engaging member 12. The accelerometer provides an output signal coupled to controller 20. The accelerometers 25 provide an output signal indicating movement of the ground engaging members and the suspension components 16 and 18 as the vehicle traverses different terrain.

Additional sensors may include a vehicle speed sensor 26, a steering sensor 28 and a chassis accelerometer 30 all having output signals coupled to the controller 20. Accelerometer 30 is illustratably a three-axis accelerometer located on the chassis to provide an indicating of forces on the vehicle during operation. Additional sensors include a brake sensor 32, a throttle position sensor 34, a wheel speed sensor 36, and a gear selection sensor 38. Each of these sensors has an output signal coupled to the controller 20.

Figure 2:
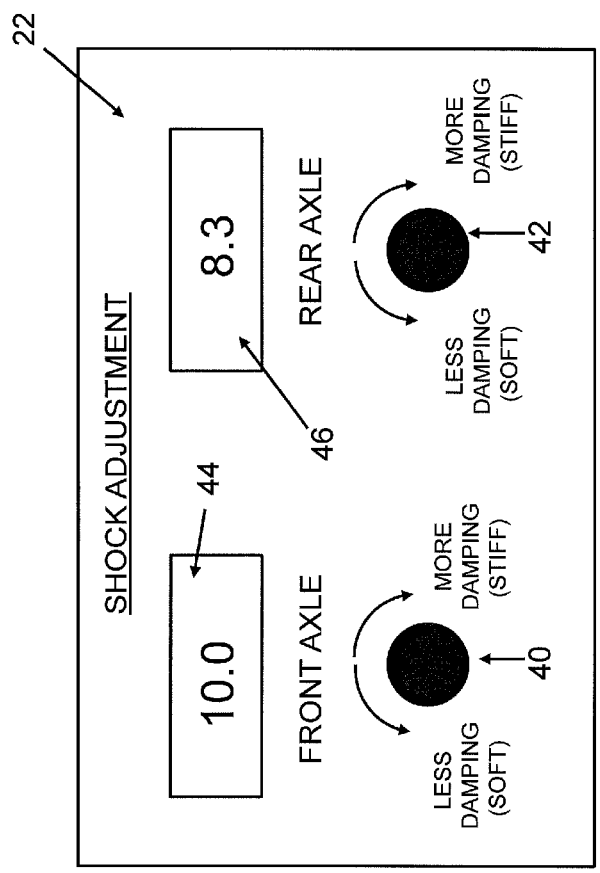
FIG. 2 illustrates an exemplary user interface for controlling damping at a front axle and a rear axle of the vehicle.

In an illustrated embodiment of the present disclosure, the user interface 22 shown in FIG. 2 includes manual user inputs 40 and 42 for adjusting damping of the front and rear axle shock absorbers 18. User interface 22 also includes first and second displays 44 and 46 for displaying the damping level settings of the front shock absorbers and rear shock absorbers, respectively. In operation, the driver or passenger of the vehicle can adjust user inputs 40 and 42 to provide more or less damping to the shock absorbers 18 adjacent the front axle and rear axle of the vehicle. In the illustrated embodiment, user inputs 40 and 42 are rotatable knobs. By rotating knob 40 in a counter clockwise direction, the operator reduces damping of the shock absorbers 18 adjacent the front axle of the vehicle. This provides a softer ride for the front axle. By rotating the knob 40 in a clockwise direction, the operator provides more damping on the shock absorbers 18 adjacent the front axle to provide a stiffer ride. The damping level for front axle is displayed in display 44. The damping level may be indicated by any desired numeric range, such as for example, between 0-10, with 10 being the most stiff and 0 the most soft.

The operator rotates knob 42 in a counter clockwise direction to reduce damping of the shock absorbers 18 adjacent the rear axle. The operator rotates the knob 42 in a clockwise direction to provide more damping to the shock absorbers 18 adjacent the rear axle of the vehicle. The damping level setting of the rear shock absorbers 18 is displayed in display window 46.

Figure 3:
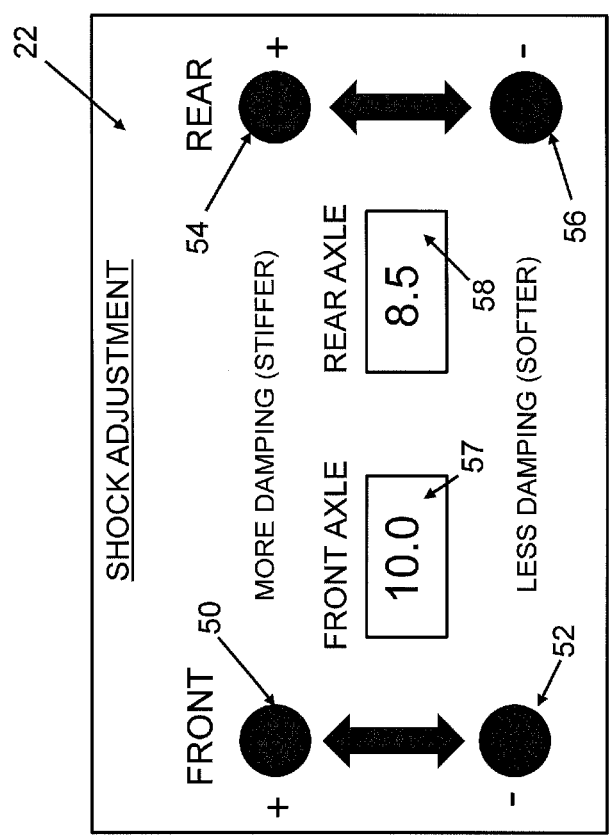
FIG. 3 illustrates another exemplary embodiment of a user interface for continuous damping control of shock absorbers of the vehicle.

Another embodiment of the user interface 22 is illustrated in FIG. 3. In this embodiment, push buttons 50 and 52 are provided for adjusting the damping level of shock absorbers 18 located adjacent the front axle and push buttons 54 and 56 are provided for adjusting the damping of shock absorbers 18 located adjacent rear axle. By pressing button 50, the operator increases the damping of shock absorbers 18 located adjacent the front axle and pressing button 52 reducing the damping of shock absorbers 18 located adjacent front axle. The damping level of shock absorbers 18 adjacent front axle is displayed within display window 57. As discussed above, the input control switches can be located any desired location on the vehicle. For example, in other illustrated embodiments, the user inputs are on a steering wheel, handle bar, or other steering control of the vehicle to facilitate actuation of the damping adjustment.

Similarly, the operator presses button 54 to increase damping of the shock absorbers located adjacent the rear axle. The operator presses button 56 to decrease damping of the shock absorbers located adjacent the rear axle. Display window 58 provides a visual indication of the damping level of shock absorbers 18 adjacent the rear axle. In other embodiments, different user inputs such as touch screen controls, slide controls, or other inputs may be used to adjust the damping level of shock absorbers 18 adjacent the front and rear axles. In other embodiments, different user inputs such as touch screen controls, slide controls, or other inputs may be used to adjust the damping level of shock absorbers 18 adjacent all four wheels at once.

Figure 4:
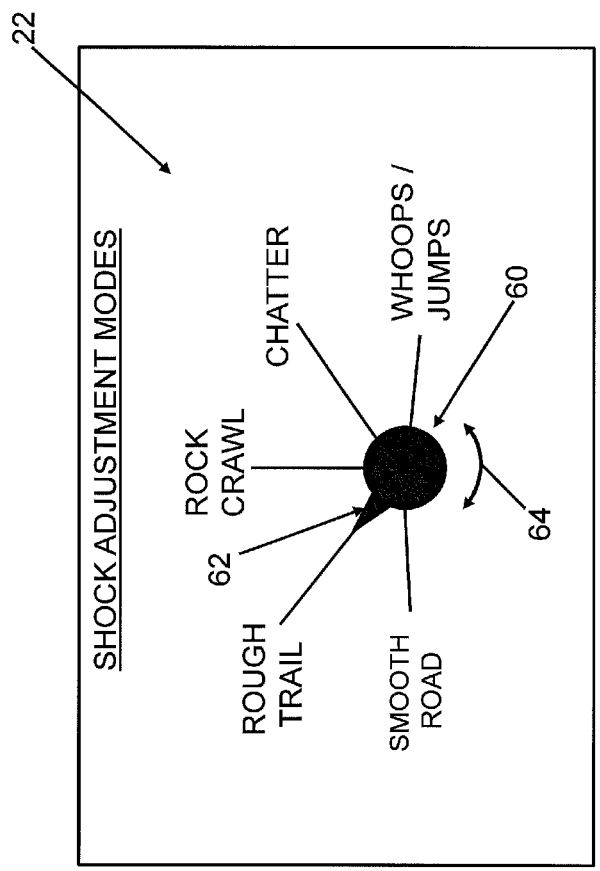
FIG. 4 illustrates yet another user interface for setting various modes of operation of the continuous damping control depending upon the terrain being traversed by the vehicle.

FIG. 4 illustrates yet another embodiment of the present disclosure in which the user interface 22 includes a rotatable knob 60 having a selection indicator 62. Knob 60 is rotatable as illustrated by double-headed arrow 64 to align the indicator 62 with a particular driving condition mode. In the illustrated embodiment, five modes are disclosed including a smooth road mode, a rough trail mode, a rock crawl mode, a chatter mode, and a whoops/jumps mode. Depending on the driving conditions, the operating rotates the control knob 60 to select the particular driving mode. Controller 20 automatically adjusts damping levels of adjustable shocks 18 adjacent front and rear axles of the vehicle based on the particular mode selected.

It is understood that various other modes may be provided including a sport mode, trail mode, or other desired mode. In addition, different modes may be provided for operation in two-wheel drive, four-wheel drive, high and low settings for the vehicle. Illustrative operation modes include:

Smooth Road Mode—Very stiff settings designed to minimize transient vehicle pitch and roll through hard acceleration, braking, and cornering.

Normal Trail Mode—Similar to smooth road mode, but a little bit softer set-up to allow for absorption of rocks, roots, and potholes but still have good cornering, accelerating, and braking performance.

Rock Crawl Mode—This would be the softest setting allowing for maximum wheel articulation for slower speed operation. In one embodiment, the rock crawl mode is linked to vehicle speed sensor 26.

High Speed Harsh Trail (Chatter)—This setting is between Normal Trail Mode and Rock Crawl Mode allowing for high speed control but very plush ride (bottom out easier).

Whoops and Jumps Mode—This mode provides stiffer compression in the dampers but less rebound to keep the tires on the ground as much as possible.

These modes are only examples one skilled in the art would understand there could be many more modes depending on the desired/intended use of the vehicle.

In addition to the driving modes, the damping control may be adjusted based on outputs from the plurality of sensors coupled with the controller 20. For instance, the setting of adjustable shock absorbers 18 may be adjusted based on vehicle speed from speed sensor 26 or outputs from the accelerometers 25 and 30. In vehicles moving slowly, the damping of adjustable shock absorbers 18 is reduced to provide a softer mode for a better ride. As vehicle's speed increases, the shock absorbers 18 are adjusted to a stiffer damping setting. The damping of shock absorbers 18 may also be coupled and controlled by an output from a steering sensor 28. For instance, if the vehicle makes a sharp turn, damping of shock absorbers 18 on the appropriate side of the vehicle may be adjusted instantaneously to improve ride.

The continuous damping control of the present disclosure may be combined with adjustable springs 16. The springs 16 may be a preload adjustment or a continuous dynamic adjustment based on signals from the controller 20.

An output from brake sensor 32 may also be monitored and used by controller 20 to adjust the adjustable shocks 18. For instance, during heavy braking, damping levels of the adjustable shocks 18 adjacent the front axle may be adjusted to reduce "dive" of the vehicle. In an illustrated embodiment, dampers are adjusted to minimize pitch by determining which direction the vehicle is traveling, by sensing an input from the gear selection sensor 38 and then adjusting the damping when the brakes are applied as detected by the brake sensor 32. In an illustrative example, for improved braking feel, the system increases the compression damping for shock absorbers 18 in the front of the vehicle and adds rebound damping for shock absorbers 18 in the rear of the vehicle for a forward traveling vehicle.

In another embodiment, an output from the throttle position sensor is used by controller 20 to adjust the adjustable shock absorbers 18 to adjust or control vehicle squat which occurs when the rear of the vehicle drops or squats during acceleration. For example, controller 20 may stiffen the damping of shock absorbers 18 adjacent rear axle during rapid acceleration of the vehicle. Another embodiment includes driver-selectable modes that control a vehicle's throttle map and damper settings simultaneously. By linking the throttle map and the CDC damper calibrations together, both the throttle (engine) characteristics and the suspension settings simultaneously change when a driver changes operating modes.

In another embodiment, a position sensor is provided adjacent the adjustable shock absorbers 18. The controller 20 uses these position sensors to stiffen the damping of the adjustable shocks 18 near the ends of travel of the adjustable shocks.

This provides progressive damping control for the shock absorbers. In one illustrated embodiment, the adjustable shock position sensor is an angle sensor located on an A-arm of the vehicle suspension. In another embodiment, the adjustable shocks include built in position sensors to provide an indication when the shock is near the ends of its stroke.

In another illustrated embodiment, based on gear selection detected by gear selection sensor 38, the system limits the range of adjustment of the shock absorbers 18. For example, the damping adjustment range is larger when the gear selector is in low range compared to high range to keep the loads in the accepted range for both the vehicle and the operator.

Figure 5:
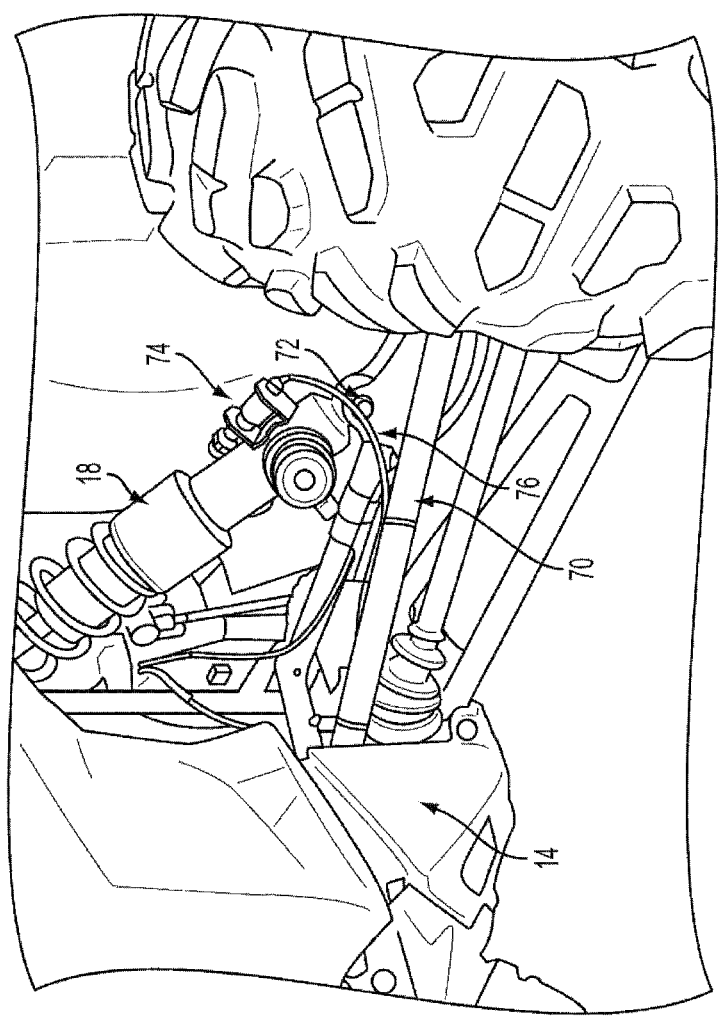
FIG. 5 illustrates an adjustable damping shock absorber coupled to a vehicle suspension.

FIG. 5 illustrates an adjustable shock absorber 18 mounted on an A-arm linkage 70 having a first end coupled to the vehicle frame 14 and a second end coupled to a wheel 12. The adjustable shock absorber 18 includes a first end 72 pivotably coupled to the A-arm 70 and a second end (not shown) pivotably coupled to the frame 14. A damping control activator 74 is coupled to controller 20 by a wire 76.

Demonstration Mode

In an illustrated embodiment of the present disclosure, a battery 80 is coupled to controller 20 as shown in FIG. 1. For operation in a demonstration mode in a showroom, the controller 20, user interface 22 and display 24 are activated using a key in an ignition of the vehicle or a wireless key to place the vehicle in accessory mode. This permits adjustment of the adjustable shock absorbers 18 without starting the vehicle. Therefore, the operation of the continuous damping control features of the present disclosure may be demonstrated to customers in a show room where it is not permitted to start the vehicle due to the enclosed space. This provides an effective tool for demonstrating how quickly the continuous damping control of the present disclosure works to adjust damping of front and rear axles of the vehicle.

As described herein, the system of the present disclosure includes four levels or tiers of operation. In the first tier, the adjustable shock absorbers 18 are adjusted by manual input only using the user interface 22 and described herein. In the second tier of operation, the system is semi-active and uses user inputs from the user interface 22 combined with vehicle sensors discussed above to control the adjustable shock absorbers 18. In the third tier of operation, input accelerometers 25 located adjacent the ground engaging members 12 and a chassis accelerometer 30 are used along with steering sensor 28 and shock absorber stroke position sensors to provide additional inputs for controller 20 to use when adjusting the adjustable shock absorbers 18. In the forth tier of operation, the controller 20 cooperates with a stability control system to adjust the shock absorbers 18 to provide enhanced stability control for the vehicle 10.

In another illustrated embodiment, vehicle loading information is provided to the controller 20 and used to adjust the adjustable shock absorbers 18. For instance, the number of passengers may be used or the amount of cargo may be input in order to provide vehicle loading information. Passenger or cargo sensors may also be provided for automatic inputs to the controller 20. In addition, sensors on the vehicle may detect attachments on the front or rear of the vehicle that affect handling of the vehicle. Upon sensing heavy attachments on the front or rear of the vehicle, controller 20 adjusts the adjustable shock absorbers 18. For example, when a heavy attachment is put on to the front of a vehicle, the compression damping of the front shocks may be increased to help support the additional load.

In other illustrative embodiments of the present disclosure, methods for actively controlling damping of electronically adjustable shocks using both user selectable modes and a plurality of sensor inputs to actively adjust damping levels are disclosed. A central controller is used to read inputs from the plurality of vehicle sensors continuously and send output signals to control damping characteristics of the electronically adjustable shocks. Illustrative embodiments control damping of the plurality of electronically adjustable shocks based on one or more of the following control strategies:

Vehicle speed based damping table
Roll control: Vehicle steering angle and rate of steer damping table
Jump control: Detect air time and adjust damping accordingly
Pitch control: Brake, dive, and squat
Use of a lookup table or a multi-variable equation based on sensor inputs
Acceleration sensing: Select damping based on frequency of chassis acceleration
Load sensing: Increase damping based on vehicle/box load
Oversteer/understeer detection
Factory defaults, key-on mode selection
Fail safe defaults to full firm
Time delay that turns solenoid off after a set period of time to conserve power at idle In illustrative embodiments of the present disclosure, a user selectable mode provides damping control for the electronic shocks. In addition to the methods discussed above, the present disclosure includes modes selectable by the user through a knob, touch screen, push button or other user input. Illustrative user selectable modes and corresponding sensors and controls include:

In addition to damping control, the following bullet point items can also be adjusted in each mode:
1. Factory Default Mode
2. Soft/Comfort Mode
Vehicle speed
Turning
Air born—jumps
eCVT: Maintain low RPM>quiet
higher assist EPS calibration
3. Auto/Sport Mode
Pitch control
Tied to brake switch
Throttle (CAN) position
Roll control
Lateral acceleration
Steering position (EPS sensor)
Vehicle speed
"Auto" means use damping table or algorithm, which incorporates all these inputs
4. Firm/Race Mode
eCTV: Higher engagement
Aggressive throttle pedal map
Firm (lower assist at speed) EPS calibration
Full firm damping
5. Rock Crawling Mode
Increase ride height—spring preload
Rebound increase to deal with extra preload
Soft stabilizer bar
Speed limit
6. Desert/Dunes Mode
Soft stabilizer bar
Speed based damping
Firmer damping than "Soft"
7. Trail/Cornering Mode
Lower ride height
Stiffer stabilizer bar
Increase damping
Firm EPS calibration 8. Work Mode (Lock-out, full firm)
eCVT: Smooth engagement
eCVT: Maintain low RPM>quiet, dependent on engine load
Load sensing damping & preload
9. Economy Mode
Lower ride height
Engine cal
eCVT cal In illustrative embodiments of the present disclosure, sensor inputs include one or more of the following:
Damping mode selection
Vehicle speed
4WD mode
ADC mode
Transmission mode—CVT and other transmission types
EPS mode
Ambient temp
Steering angle
Chassis Acceleration (lateral, long, vertical)
Steering Wheel Acceleration
Gyroscope
GPS location
Shock position
Shock temperature
Box load/distribution
Engine sensors (rpm, temp, CAN)
Throttle pedal
Brake input/pressure
Passenger Sensor (weight or seatbelt)

Figure 6:
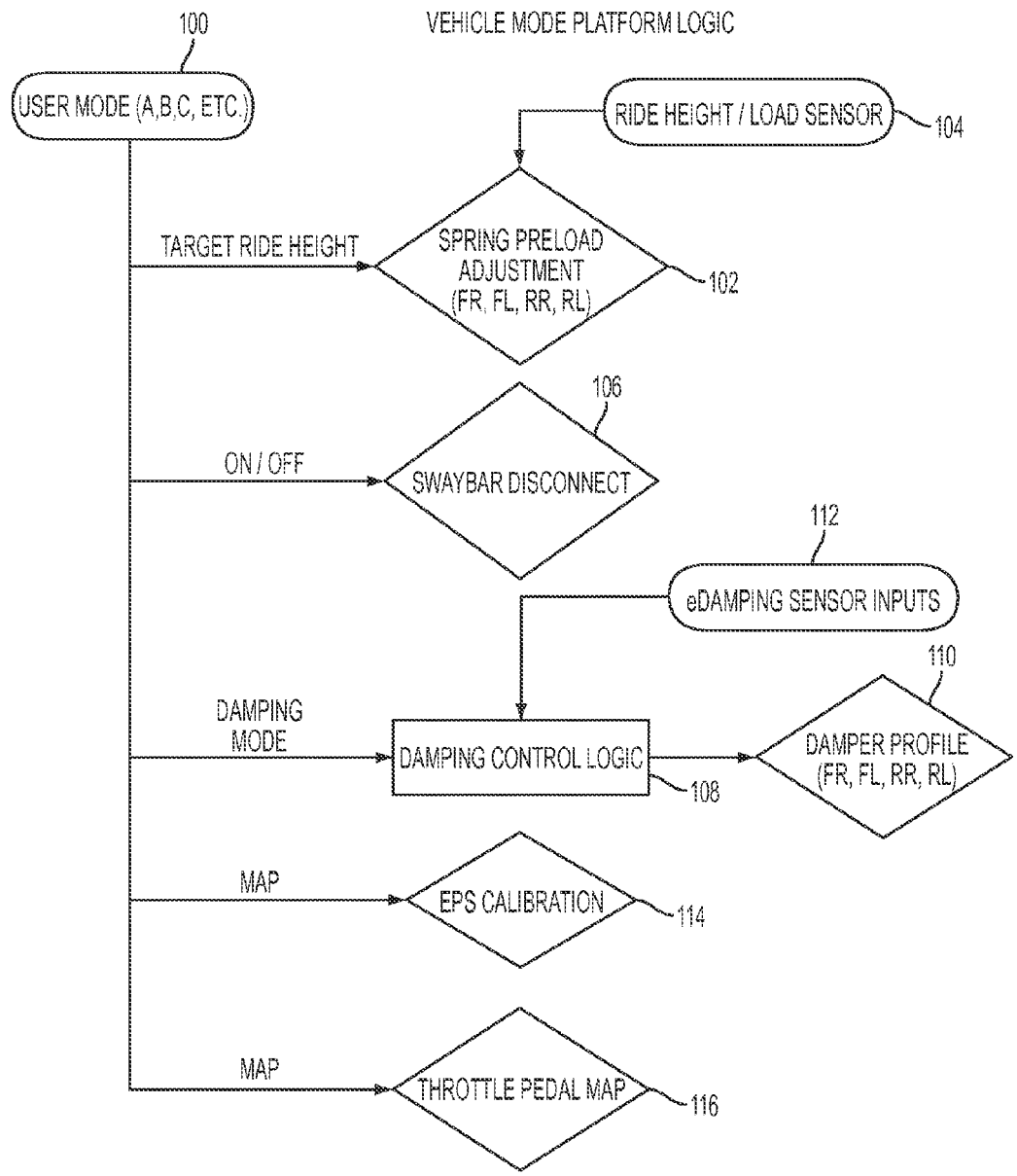
FIG. 6 is a flow chart illustrating vehicle platform logic for controlling various vehicle parameters in a plurality of different user selectable modes of operation.

In illustrative embodiments of the present disclosure, damping control system is integrated with other vehicle systems as follow:
Vehicle Systems Integration
EPS calibration
Unique calibrations for each driver mode. Full assist in work or comfort mode.
Automatic preload adjustment setting (electronic and/or hydraulic control)
Load leveling
Smooth trail/on-road mode=lower, Rock crawl=higher
Increase rebound damping for higher preloads
Haul mode=increased preload in rear. Implement mode=increased preload in front
Vehicle speed limits
Increase damping with vehicle speed for control and safety using lookup table or using an algorithm
adjusts the minimum damping level in all modes beside "Firm"
firm mode would be at max damping independent of vehicle speed
lower ride height (preload) with vehicle speed in certain modes
eCVT calibration
Unique calibrations for each driver mode that ties in with electronic damping and preload. (comfort mode=low rpm, soft damping)
Engine/pedal map calibration
Unique calibrations for each driver mode that ties in with electronic damping and preload. (comfort mode=soft pedal map, soft damping)
Steer by wire
Load sensing
Decoupled wheel speed for turning
4 wheel steer
Active Stabilizer Bar Adjustment
Traction Control
Stability Control
ABS
Active Brake Bias
Preload control FIG. 6 is a flow chart illustration vehicle mode platform logic for a system and method of the present disclosure. In the illustrated embodiment, a user selects a user mode as illustrated at block 100. The selection may be a rotary knob, a button, a touch screen input, or other user input. A controller 20 uses a look up cable or algorithm to determine preload adjustments for adjustable springs at the front right, front left, rear right and rear left of the vehicle to adjust a target ride height for the vehicle as illustrated at bock 102. Controller 20 receives a ride height and/or load sensor input as illustrated at block 104 so that the controller 20 adjusts the spring preload based on vehicle loads.

Controller 20 then determines whether a sway bar or stabilizer bar should be connected or disconnected as illustrated at block 106. As discussed in detail below, the stabilizer bar may be connected or disconnected depending upon the selected mode and sensor inputs.

Controller 20 also implements damping control logic as discussed below and illustrated at block 108. Controller 20 uses a damper profile for the front right, front left, rear right, and rear left adjustable shocks as illustrated block 110. A plurality of sensor inputs are provided to the controller 20 as illustrated at block 112 and discussed in detail below to continuously control the damping characteristics of the adjustable shocks.

Figure 7:
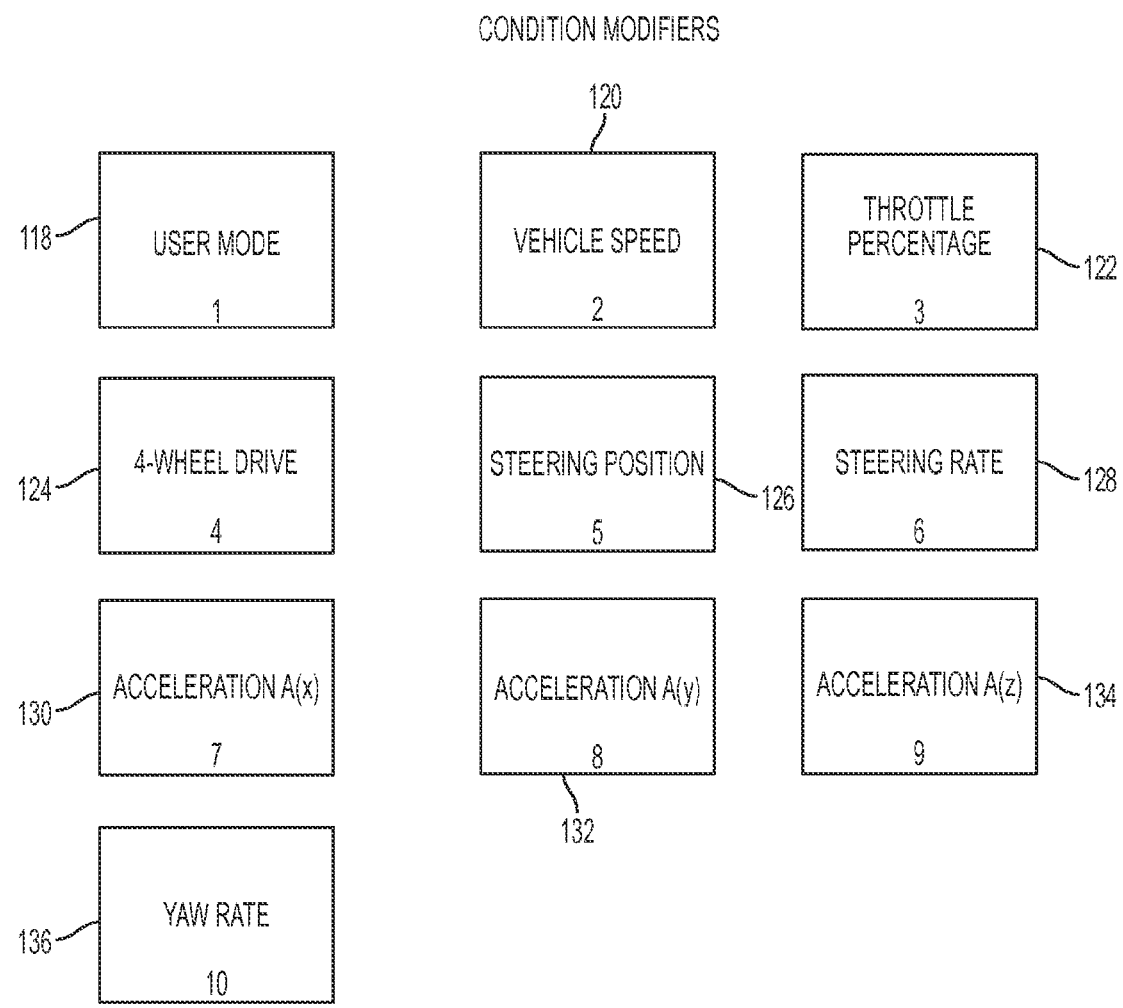
FIG. 7 is a block diagram illustrating a plurality of different condition modifiers used as inputs in different control modes to modify damping characteristics of electronically adjustable shock absorbers or dampers in accordance with the present disclosure.
Figure 14:
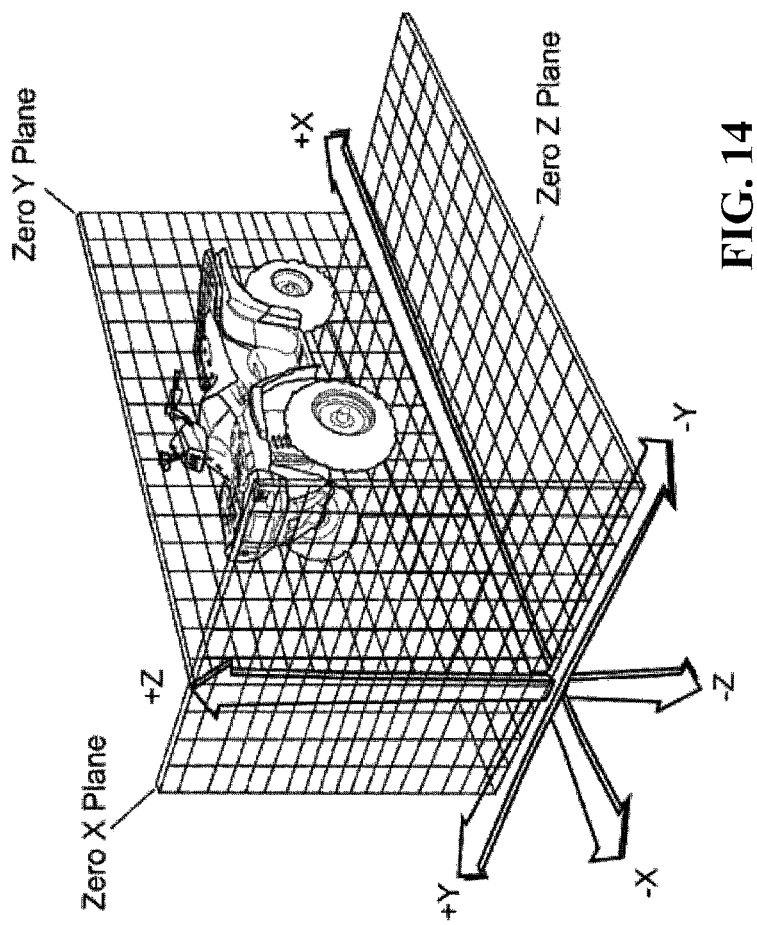
FIG. 14 illustrates an x-axis, a y-axis, and a z-axis for a vehicle such as an ATV.

Controller 20 uses a stored map for calibration of an electronic power steering (EPS) of the vehicle as illustrated at block 114. Finally, the controller 20 uses a map to calibrate a throttle pedal position of the vehicle as illustrated at block 116. The damping control method of the present discloses uses a plurality of different condition modifiers to control damping characteristics of the electrically adjustable shocks. Exemplary condition modifiers include parameters set by the particular user mode selected as illustrated at block 118, a vehicle speed as illustrated at block 120, a throttle percentage as illustrated at block 122. Additional condition modifiers include a drive mode sensor such as 4-wheel drive sensor as illustrated at block 124, a steering position sensor as illustrated at block 126, and a steering rate sensor as illustrated at block 128. Drive mode sensor 124 may include locked front, unlocked front, locked rear, unlocked rear, or high and low transmission setting sensors. Condition modifiers further include an x-axis acceleration sensor as illustrated at block 130, a y-axis acceleration sensor as illustrated at block 132, and a z-axis acceleration sensor illustrated at block 134. The x-axis, y-axis, and z-axis for a vehicle such as an ATV are shown in FIG. 14. Another illustrative condition modifier is a yaw rate sensor as illustrated at block 136. The various condition modifiers illustrated in FIG. 7 are labeled 1-10 and correspond to the modifiers which influence operation of the damping control logic under the various drive conditions shown in FIGS. 8-10.

In a passive method for controlling the plurality of electronic shock absorbers, the user selected mode discussed above sets discrete damping levels at all corners of the vehicle. Front and rear compression and rebound are adjusted independently based on the user selected mode of operation without the use of active control based on sensor inputs.

Figure 8:
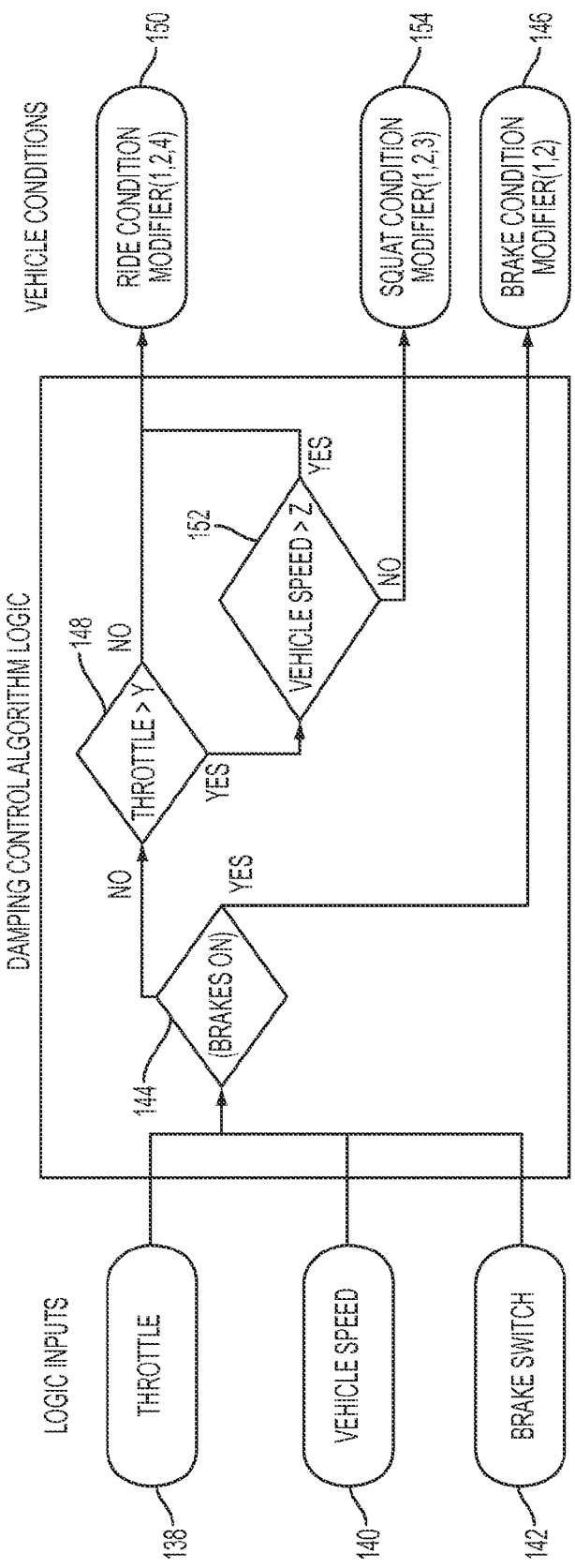
FIG. 8 is a flow chart illustrating a damping control method for controlling the vehicle operating under a plurality of vehicle conditions based upon a plurality of sensor inputs in accordance with one embodiment of the present invention.

One illustrated method for active damping control of the plurality of electronic shock absorbers is illustrated in FIG. 8.

The method of FIG. 8 uses a throttle sensor 138, a vehicle speed sensor 140, and a brake switch or brake pressure sensor 142 as logic inputs. The controller 20 determines whether the brakes are on as illustrated at block 144. If so, the controller 20 operates the damping control method in a brake condition as illustrated at block 146. In the brake condition, front suspension compression (dive) is detected as a result of longitudinal acceleration from braking input. In the Brake Condition 146, the condition modifiers include the user selected mode 118 and the vehicle speed 120 to adjust damping control. In the vehicle conditions of FIGS. 8-10, the selected user mode modifier 118 determines a particular look-up table that defines damping characteristics for adjustable shocks at the front right, front left, rear right, and rear left of the vehicle. In brake condition 146, compression damping of the front shocks and/or rebound damping on the rear shocks is provided based on the brake signal.

In the Brake Condition 146, the controller 20 increases damping based on increasing vehicle speed. Further, controller 20 increases compression damping on front and/or rebound damping on the rear shocks based on brake sensor signal. User mode modifiers 118 select the lookup table and/or algorithm that defines the damping characteristics at each corner based on above inputs.

If the brakes are not on at block 144, controller 20 determines whether the throttle position is greater than a threshold Y as illustrated at block 148. If not, controller 20 operates the vehicle in a Ride Condition as illustrated at block 150. In the ride condition, the vehicle is being operated in generally a straight line where vehicle ride and handling performance while steering and cornering is not detected. In the Ride Condition 150, condition modifiers used to control damping include user mode 118, vehicle speed 120, and a drive mode sensor such as 4-wheel drive sensor 124. In the Ride Condition 150, the controller 20 increases damping based on the vehicle speed. User mode modifiers 118 select the lookup table and/or algorithm that defines the damping characteristics at each corner based on above inputs.

If the throttle position in greater than the threshold Y at block 148, the controller 20 determines whether a vehicle speed is greater than a threshold value Z at block 152. If so, the controller 20 operates the vehicle in the Ride Condition at block 150 as discussed above. If the vehicle speed is less than the threshold value Z at block 152, the controller 20 operates the vehicle in a Squat Condition as illustrated at block 154. In the Squat Condition 154, condition modifiers for controlling damping include the user selected mode 118, the vehicle speed 120, and the throttle percentage 122. During a Squat Condition 154, compression damping on the rear shocks and/or rebound damping on the front shocks is increased based upon the throttle sensor signal and vehicle speed. Rear suspension compression (squat) is a result of longitudinal acceleration from throttle input.

In the Squat Condition 154, the controller 20 increases damping based on increasing vehicle speed. Further, controller 20 increases compression damping on rear and/or rebound damping on the front shocks based on the throttle sensor signal and vehicle speed. User mode modifiers 118 select the lookup table and/or algorithm that defines the damping characteristics at each corner based on above inputs.

Figure 9:
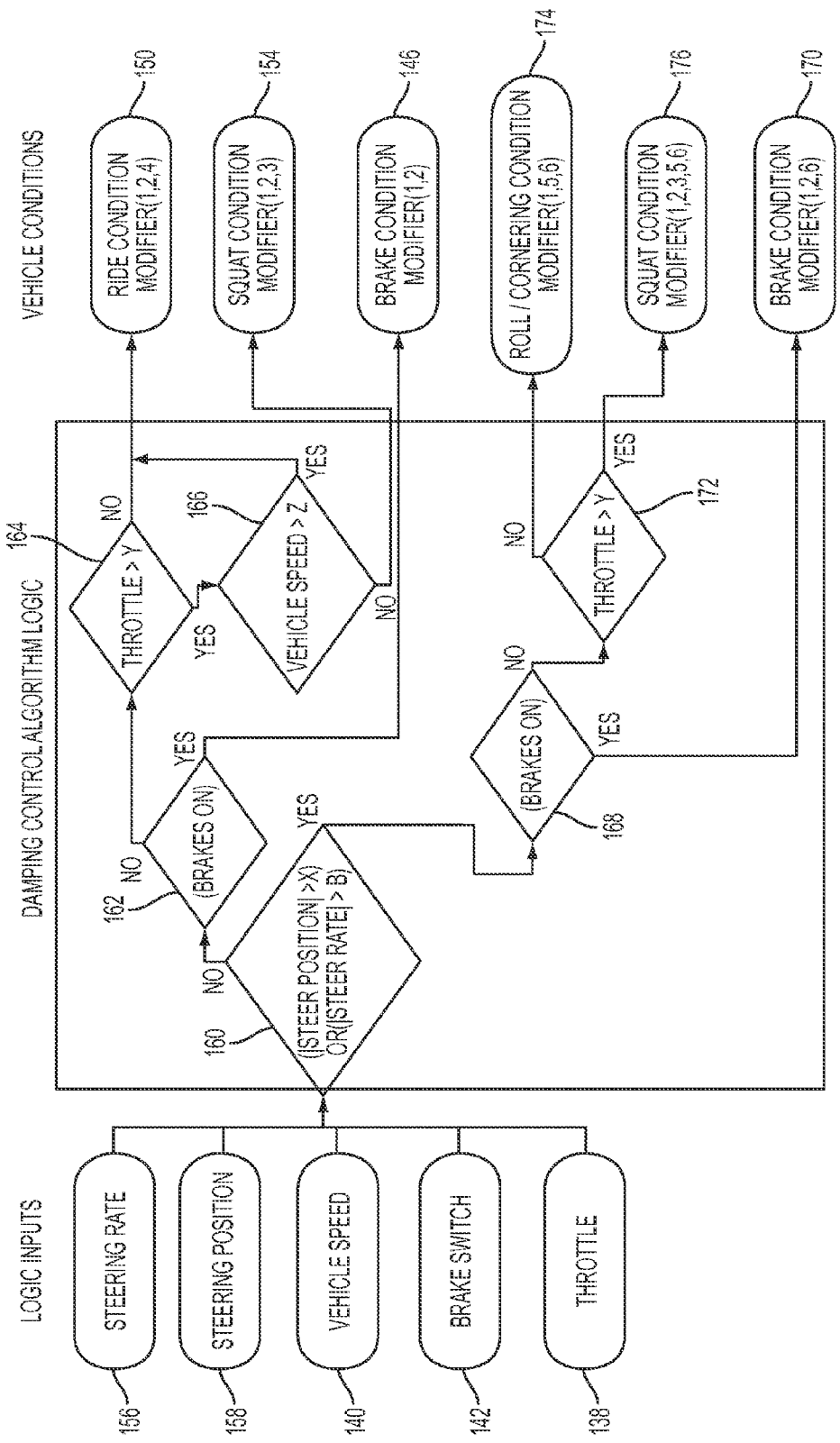
FIG. 9 is a flow chart illustrating another embodiment of a damping control method of the present disclosure.

Another embodiment of the present disclosure including different sensor input options is illustrated in FIG. 9. In the FIG. 9 embodiment, a throttle sensor 138, vehicle speed sensor 140, and brake sensor 142 are used as inputs as discussed in FIG. 8. In addition, a steering rate sensor 156 and steering position sensor 158 also provide inputs to the controller 20. Controller 20 determines whether an absolute value of the steering position is greater than a threshold X or an absolute value of the steering rate is greater than a threshold B as illustrated at block 160. If not, controller 20 determines whether the brakes are on as illustrated at block 162. If not, controller 20 determines whether the throttle position is greater than a threshold Y as illustrated at block 164. If the throttle position is greater than the threshold Y at block 164, controller 20 operates the vehicle in the Ride Condition as illustrated at block 150 and discussed above. In the Ride Condition 150, the controller 20 increases damping based on the vehicle speed. User mode modifiers 118 select the lookup table and/or algorithm that defines the damping characteristics at each corner based on above inputs.

If the throttle position is greater than the threshold Y at block 164, controller 20 determines whether the vehicle speed is greater than a threshold Z as illustrated at block 166. If so, controller 20 operates the vehicle in the Ride Condition as illustrated at block 150. If the vehicle speed is less than the threshold Z at block 166, controller 20 operates the vehicle in Squat Condition 154 discussed above with reference to FIG. 8. In the Squat Condition 154, the controller 20 increases damping based on increasing vehicle speed. Further controller 20 increases compression damping on rear and/or rebound damping on the front shocks based on the throttle sensor signal and vehicle speed. User mode modifiers 118 select the lookup table and/or algorithm that defines the damping characteristics at each corner based on above inputs.

If the brakes are on at block 162, controller 20 operates the vehicle in the Brake Condition 146 as discussed above with reference to FIG. 8. In the Brake Condition 146, the controller 20 increases damping based on increasing vehicle speed. Further controller 20 increases compression damping on front and/or rebound damping on the rear shocks based on brake sensor signal. User mode modifiers 118 select the lookup table and/or algorithm that defines the damping characteristics at each corner based on above inputs.

If the absolute value of the steering position is greater than the threshold X or the absolute value of the steering rate is greater than the threshold B at block 160, controller 20 determines whether the brakes are on as illustrated at block 168. If so, controller 20 operates the vehicle in a Brake Condition as illustrated at block 170. In the Brake Condition 170, mode modifiers for controlling damping include the user input 118, the vehicle speed 120, and the steering rate 128.

In the Brake Condition 170, the controller 20 increases damping based on increasing vehicle speed. Further, controller 20 increases compression damping on the outside front corner shock based on inputs from the steering sensor, brake sensor, and vehicle speed sensor. User mode modifiers 118 select the lookup table and/or algorithm that defines the damping characteristics at each corner based on above inputs.

If the brakes are not on at block 168, controller 20 determines whether the throttle position is greater than a threshold Y as illustrated at block 172. If not, vehicle controller 20 operates the vehicle in a Roll/Cornering Condition as illustrated at block 174. In the Roll/Cornering Condition at block 174, the condition modifiers for controlling damping include user mode 118, the steering position 126, and the steering rate 128. In a Roll/Cornering Condition, vehicle body roll occurs as a result of lateral acceleration due to steering and cornering inputs.

In the Roll/Cornering Condition 174, the controller 20 increases damping based on increasing vehicle speed. Further controller 20 increases compression damping on the outside corner shocks and/or rebound damping on the inside corner shocks when a turn event is detected via steering sensor. For a left hand turn, the outside shock absorbers are the front right and rear right shock absorbers and the inside shock absorbers are front left and rear left shock absorbers. For a right hand turn, the outside shock absorbers are the front left and rear left shock absorbers and the inside shock absorbers are front right and rear right shock absorbers. User mode modifiers 118 select the lookup table and/or algorithm that defines the damping characteristics at each corner based on above inputs.

If the throttle position is greater than the threshold Y at block 172, controller 20 operates the vehicle in a Squat Condition as illustrated at block 176. In the Squat Condition 176, controller 20 uses the mode modifiers for user mode 118, vehicle speed 120, throttle percentage 122, steering position 126, and steering rate 128 to control the damping characteristics. Again, damping is increased base on increasing vehicle speed. In addition, compression damping is increased on outside rear corners based upon steering sensor, throttle sensor and vehicle speed.

In the Squat Condition 176, the controller 20 increases damping based on increasing vehicle speed. Further, controller 20 increases compression damping on the outside rear corner shock based on inputs from the steering sensor, throttle sensor, and vehicle speed. User mode modifiers 118 select the lookup table and/or algorithm that defines the damping characteristics at each corner based on above inputs.

Figure 10:
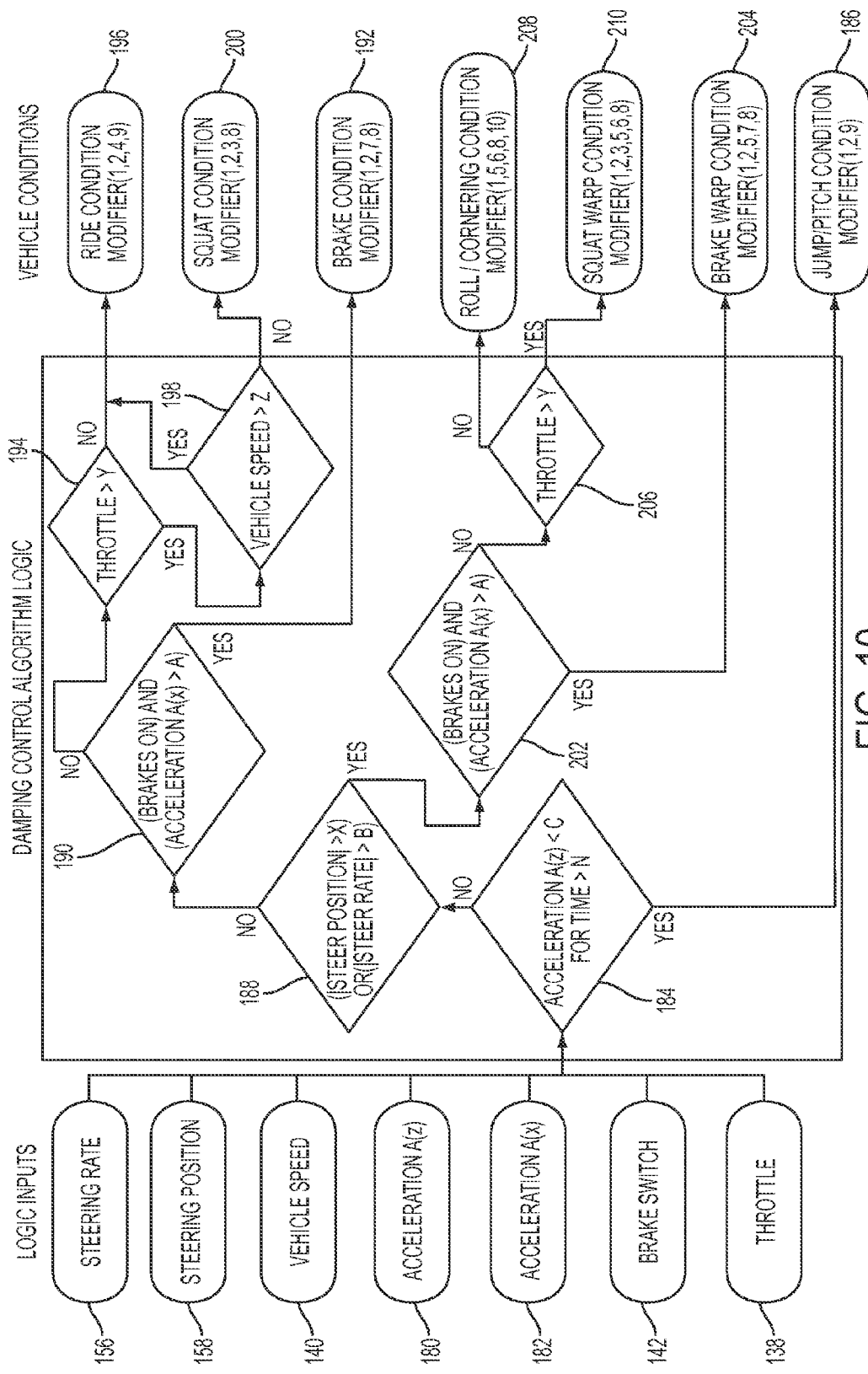
FIG. 10 is a flow chart illustrating yet another damping control method of the present disclosure.

FIG. 10 illustrates yet another embodiment of a damping control method of the present disclosure including different sensor input options compared to the embodiments of FIGS. 8 and 9. In addition to throttle sensor 138, vehicle speed sensor 140, brake sensor 142, steering position sensor 158, and steering rate sensor 156, the embodiment of FIG. 10 also uses a z-axis acceleration sensor 180 and an x-axis acceleration sensor 182 as inputs to the controller 20.

Controller 20 first determines whether acceleration from the z-axis sensor 180 is less than a threshold C for a time greater than a threshold N as illustrated at block 184. If so, controller 20 determines that the vehicle is in a jump and controls the vehicle in a Jump/Pitch condition as illustrated at block 186 where the suspension is allowed to drop out and the tires lose contact with the ground surface. In the Jump/Pitch Condition 186, controller 20 uses condition modifiers for the user input 118, the vehicle speed 120, and the z-axis acceleration sensor 134 to control the damping characteristics.

In the Jump/Pitch Condition 186, the controller 20 increases damping based on increasing vehicle speed. Further, controller 20 increases compression damping on shocks at all four corners when an airborne event is detected (and the duration of the airborne event) via negative vertical acceleration detected by the z-axis acceleration sensor 134. The controller 20 maintains the damping increase for a predetermined duration after the jump event. If positive vertical acceleration is detected by z-axis acceleration sensor 134 having a magnitude greater than a threshold value and for longer than a threshold duration (such as when contact with the ground is made after an airborne event), whereas greater acceleration reduces the duration threshold required, rebound damping may be increased to the rear and/or front shocks for an amount of time. User mode modifiers 118 select the lookup table and/or algorithm that defines the damping characteristics at each corner based on above inputs.

If an airborne event is not detected at block 184, controller 20 determines whether an absolute value of the steering position is greater than a threshold X or an absolute value of the steering rate is greater than a threshold B at block 188. If not, controller 20 determines whether the brakes are on and the x-axis acceleration is greater than a threshold value A at block 190. If so, controller 20 operates the vehicle in a Brake Condition as illustrated at block 192.

In the Brake Condition 192, condition modifiers for the user input 118, the vehicle speed 120, the x-axis accelerometer 130, and the y-axis accelerometer 132 are used as inputs for the damping control. In the Brake Condition 192, the controller 20 increases damping based on increasing vehicle speed. Further, controller 20 increases compression damping on an outside front corner shock based on inputs from steering sensor 158, brake sensor 142, vehicle speed sensor 140, and/or acceleration sensor 180. User mode modifiers 118 select the lookup table and/or algorithm that defines the damping characteristics at each corner based on above inputs.

If the determination at block 190 is negative, controller 20 determines whether the throttle position is greater than a threshold Y as illustrated at block 194. If not, controller 20 operates the vehicle in a Ride Condition as illustrated at block 196. In the Ride Condition 196, controller 20 uses condition modifiers for the user-selected mode 118, the vehicle speed 120, a drive mode sensor such as four-wheel drive sensor 124, and the z-axis accelerometer 134 to control damping characteristics. In the Ride Condition 196, the controller 20 increases damping based on the vehicle speed. User mode modifiers 118 select the lookup table and/or algorithm that defines the damping characteristics at each corner based on above inputs.

If the throttle position is greater than threshold Y at block 194, controller 20 determines whether the vehicle speed is greater than a threshold Z as illustrated at block 198. If so, the controller 20 operates the vehicle and the Ride Condition 196 as discussed above. If not, the controller 20 operates the vehicle in a Squat Condition as illustrated at block 200. In the Squat Condition 200, controller 20 uses condition modifiers for the user mode 118, vehicle speed 120, throttle percentage 122, and y-axis accelerometer 132 for damping control. In the Squat Condition 200, the controller 20 increases damping based on the vehicle speed. Further, the controller 20 increases compression damping on the rear shocks and/or rebound damping on the front shocks based on inputs from throttle sensor 138, vehicle speed sensor 140, and/or acceleration sensor 180. Additional adjustments are made based on time duration and longitudinal acceleration. User mode modifiers 118 select the lookup table and/or algorithm that defines the damping characteristics at each corner based on above inputs.

If the absolute value of the steering position is greater than the threshold X or the absolute value of the steering rate is greater than the threshold B at block 188, then controller 20 determines whether the brakes are on and whether the x-axis acceleration is greater than a threshold A as illustrated at block 202. If so, controller 20 operates the vehicle in a Brake Condition as illustrated at block 204. In the Brake Condition 204, controller 20 uses condition modifiers for the user mode 118, vehicle speed 120, steering position 126, x-axis acceleration 130, and y-axis acceleration 132 to adjust the damping control characteristics of the electrically adjustable shocks. In the Brake Condition 204, the controller 20 increases damping based on increasing vehicle speed. Further, controller 20 increases compression damping on an outside front corner shock based on inputs from steering sensor 158, brake sensor 142, vehicle speed sensor 140, and/or acceleration sensor 180. User mode modifiers 118 select the lookup table and/or algorithm that defines the damping characteristics at each corner based on above inputs.

If a negative determination is made at block 202, controller 20 determines whether the throttle position is greater than a threshold Y as illustrated at block 206. If not, controller 20 operates the vehicle in a Roll/Cornering Condition as illustrated at block 208. In the Roll/Cornering Condition 208, controller 20 uses condition modifiers for the user mode 118, the steering position 126, the steering rate 128, the y-axis acceleration 132, and the yaw rate 136 to control the damping characteristics of the adjustable shocks. In the Roll/Cornering Condition 208, the controller 20 increases damping based on increasing vehicle speed. Further, controller 20 increases compression damping on the outside corner shocks and/or rebound damping on the inside corner shocks when a turn event is detected via steering sensor 156 and accelerometer 182. User mode modifiers 118 select the lookup table and/or algorithm that defines the damping characteristics at each corner based on above inputs.

If the throttle position is greater than the threshold Y at block 206, controller 20 operates the vehicle in a Squat Condition as illustrated at block 210. In the Squat Condition 210, controller 20 uses condition modifiers for the user mode 118, the vehicle speed 120, the throttle percentage 122, steering position 126, the steering rate 128, and the y-axis acceleration 132 to control the damping characteristics of the adjustable shocks. In the Squat Condition 210, the controller 20 increases damping based on the vehicle speed. Further, the controller 20 increases compression damping on the outside rear corner shock based on inputs from throttle sensor 138, vehicle speed sensor 140, and/or acceleration sensors 180 or 182. User mode modifiers 118 select the lookup table and/or algorithm that defines the damping characteristics at each corner based on above inputs.

Another embodiment of the present disclosure is illustrated in FIGS. 11-13. As part of the damping control system, a stabilizer bar linkage 220 is selectively locked or unlocked. The linkage 220 includes a movable piston 222 located within a cylinder 224. An end 226 of piston 222 as illustratively coupled to a stabilizer bar of the vehicle. An end 228 of cylinder 224 as illustratively coupled to a suspension arm or component of the vehicle. It is understood that this connection could be reversed.

A locking mechanism 230 includes a movable solenoid 232 which is biased by a spring 234 in the direction of arrow 236. The controller 20 selectively energizes the solenoid 232 to retract the removable solenoid 232 in the direction of arrow 238 from an extended position shown in FIGS. 11 and 12 to a retracted position shown in FIG. 13. In the retracted position, the end of solenoid 232 disengages a window 240 of movable piston 232 to permit free movement between the piston 222 and the cylinder 224. If the solenoid 232 is in the extended position shown in FIGS. 11 and 12 engaged with window 240, the piston 222 is locked relative to the cylinder 224.

When the linkage 220 is unlocked, the telescoping movement of the piston 222 and cylinder 224 removes the function of the stabilizer bar while the solenoid 232 is disengaged as shown in FIG. 13. When the controller 20 removes the signal from the solenoid 232, the solenoid piston 232 moves into the window 240 to lock the piston 222 relative to the cylinder 220. The solenoid 232 also enters the lock position if power is lost due to the spring 234. In other words, the solenoid 232 fails in the locked position. The vehicle is not required to be level in order for the solenoid 232 to lock the piston 222.

Unlocking the stabilizer bar 220 provides articulation benefits for the suspension system during slow speed operation. Therefore, the stabilizer bar 220 is unlocked in certain low speed conditions. For higher speeds, the stabilizer bar 220 is locked. The controller 20 may also use electronic throttle control (ETC) to limit vehicle speed to a predetermined maximum speed when stabilizer bar 220 is unlocked.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A damping control method for a vehicle having a suspension located between a plurality of wheels and a vehicle frame, a controller, a plurality of vehicle condition sensors, and a user interface, the suspension including a plurality of adjustable shock absorbers including a front right shock absorber, a front left shock absorber, a rear right shock absorber, and a rear left shock absorber, the damping control method comprising:
   receiving with the controller a user input from the user interface to provide a user selected mode of damping operation for the plurality of adjustable shock absorbers during operation of the vehicle;
   receiving with the controller a plurality of inputs from the plurality of vehicle condition sensors including a brake sensor, a throttle sensor, and a vehicle speed sensor;
   determining with the controller whether vehicle brakes are actuated based on an input from the brake sensor;
   determining with the controller a throttle position based on an input from the throttle sensor;
   determining with the controller a speed of the vehicle based on an input from the vehicle speed sensor;
   operating the damping control in a brake condition if the brakes are actuated, wherein in the brake condition the controller adjusts damping characteristics of the plurality of adjustable shock absorbers based on condition modifiers including the user selected mode and the vehicle speed;
   operating the damping control in a ride condition if the brakes are not actuated and a throttle position is less than a threshold Y, wherein in the ride condition the controller adjusts damping characteristics of the plurality of adjustable shock absorbers based on condition modifiers including the user selected mode and the vehicle speed;
   operating the damping control in the ride condition if the brakes are not actuated, the throttle position is greater than the threshold Y, and the vehicle speed is greater than a threshold value Z; and
   operating the damping control in a squat condition if the brakes are not actuated, the throttle position is greater than the threshold Y, and the vehicle speed is less than the threshold value Z, wherein in the squat condition the controller adjusts damping characteristics of the plurality of adjustable shock absorbers based on condition modifiers including the user selected mode, the vehicle speed, and a throttle percentage.

2. The method of claim 1, wherein in the brake condition the controller increases compression damping on the front right and front left shock absorbers.

3. The method of claim 2, wherein in the brake condition the controller also increases rebound damping on the rear right and rear left shock absorbers.

4. The method of claim 1, wherein in the squat condition the controller increases compression damping on rear right and rear left shock absorbers.

5. The method of claim 1, wherein in the squat condition the controller increases rebound damping on the front right and front left shock absorbers.

6. The method of claim 1, further comprising:
receiving with the controller inputs from additional vehicle condition sensors including a steering rate sensor and a steering position sensor;
determining with the controller a steering rate based on an input from the steering rate sensor;
determining with the controller a steering position based on an input from the steering position sensor; and
operating the damping control in a modified brake condition if the brakes and are actuated and either the steering position is greater than a threshold X or the steering rate is greater than a threshold B, in the modified brake condition controller adjusting damping characteristics of the plurality of adjustable shock absorbers based on condition modifiers including the user selected mode, the vehicle speed, and the steering rate.

7. The method of claim 6, further comprising operating the damping control in a roll/cornering condition if either the steering position is greater than a threshold X or the steering rate is greater than a threshold B, and if the brakes are not actuated and the throttle position is less than the threshold Y, in the roll/cornering condition the controller adjusting damping characteristics of the plurality of adjustable shock absorbers based on condition modifiers including the user selected mode, the steering position, and the steering rate.

8. The method of claim 7, wherein in the roll/cornering condition the controller increases compression damping on outside shock absorbers when a turn event is detected via the steering sensor.

9. The method of claim 7, wherein in the roll/cornering condition the controller increases rebound damping on inside shock absorbers when a turn event is detected via the steering sensor.

10. The method of claim 6, further comprising operating the damping control in a modified squat condition if either the steering position is greater than a threshold X or the steering rate is greater than a threshold B, and if the brakes are not actuated and the throttle position is greater than the threshold Y, in the modified squat condition the controller adjusting damping characteristics of the plurality of adjustable shock absorbers based on condition modifiers including the user selected mode, the vehicle speed, a throttle percentage, the steering position, and the steering rate.

11. The method of claim 10, wherein in the modified squat condition the controller increases compression damping on an outside rear corner shock absorber based on inputs from the steering sensor, throttle sensor, and vehicle speed sensor.

12. The method of claim 1, further comprising:
receiving with the controller inputs from additional vehicle condition sensors including a steering rate sensor, a steering position sensor, an x-axis acceleration sensor, and a z-axis acceleration sensor;
determining with the controller a steering rate based on an input from the steering rate sensor;
determining with the controller a steering position based on an input from the steering position sensor;
determining with the controller an x-axis acceleration based on an input from the x-axis acceleration sensor;
determining with the controller a z-axis acceleration based on an input from the z-axis acceleration sensor; and
operating the damping control based on detected conditions, the controller adjusting damping characteristics of the plurality of adjustable shock absorbers based on condition modifiers including the steering rate, the steering position, the x-axis acceleration, and the z-axis acceleration.

13. The method of claim 1, further comprising:
receiving with the controller inputs from an additional vehicle condition sensor including a z-axis acceleration sensor;
determining with the controller a z-axis acceleration based on an input from the z-axis acceleration sensor; and
operating the damping control in a jump/pitch condition if the z-axis acceleration is less than a threshold C for a time duration N, in the jump/pitch condition controller adjusting damping characteristics of the plurality of adjustable shock absorbers based on condition modifiers including the user selected mode, the vehicle speed, and the z-axis acceleration sensor.

14. The method of claim 13, wherein in the jump/pitch condition the controller increases compression damping on the front right shock absorber, front left shock absorber, rear right shock absorber, and rear left shock absorber when an airborne event is detected via negative vertical acceleration detected by the z-axis acceleration sensor.

15. The method of claim 14, wherein in the jump/pitch condition the controller maintains the damping increase for a predetermined time after the jump event ends.

16. The method of claim 13, wherein in the jump/pitch condition the controller increases rebound damping on the front right shock absorber, front left shock absorber, rear right shock absorber, and rear left shock absorber when contact with the ground occurs after an airborne event as detected via a positive vertical acceleration detected by the z-axis acceleration sensor.

17. The method of claim 1, wherein the plurality of springs and the plurality of shock absorbers are coupled between the vehicle frame and the ground engaging members through an A-arm linkage of the suspension.

18. The method of claim 1, wherein the plurality of springs and the plurality of shock absorbers are coupled between the vehicle frame and the ground engaging members through an trailing arm suspension.

19. The method of claim 1, wherein the user interface is integrated with a display on a dashboard of vehicle.

20. The method of claim 1, wherein at least one user input of the user interface is located on one of a steering wheel, a handle bar, or a steering control of the vehicle to facilitate adjustment of the damping characteristic of the at least one adjustable shock absorber by a driver of the vehicle.

21. The method of claim 1, wherein a user input of the user interface includes at least one of a touch screen control, a slide control, a rotatable knob and a push button to adjust damping characteristics of the front and rear adjustable shock absorbers.

22. The method of claim 1, further comprising receiving with the controller inputs from a drive mode sensor, and wherein the controller further adjusts damping characteristics of the plurality of adjustable shock absorbers based on condition modifiers including the drive mode sensor.

23. The method of claim 1, further comprising receiving with the controller inputs from a 4-wheel drive sensor, and determining with the controller whether the vehicle is in 4-wheel drive based on an input from the 4-wheel drive sensor; and wherein in the ride condition the controller further adjusts damping characteristics of the plurality of adjustable shock absorbers based on condition modifiers including the 4-wheel drive sensor.

* * * * *